US011438521B2

(12) United States Patent
Fujikawa et al.

(10) Patent No.: US 11,438,521 B2
(45) Date of Patent: Sep. 6, 2022

(54) IMAGE CAPTURING DEVICE, IMAGE CAPTURING METHOD, AND PROGRAM

(71) Applicant: FUJIFILM Corporation, Tokyo (JP)

(72) Inventors: Tetsuya Fujikawa, Saitama (JP); Yukinori Nishiyama, Saitama (JP); Koichi Tanaka, Saitama (JP); Tetsu Wada, Saitama (JP); Kenkichi Hayashi, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 17/361,799

(22) Filed: Jun. 29, 2021

(65) Prior Publication Data
US 2021/0329161 A1    Oct. 21, 2021

Related U.S. Application Data

(63) Continuation of application No. PCT/JP2019/041617, filed on Oct. 24, 2019.

(30) Foreign Application Priority Data

Jan. 29, 2019    (JP) .............................. JP2019-013238

(51) Int. Cl.
   *H04N 5/235*    (2006.01)
(52) U.S. Cl.
   CPC ......... *H04N 5/2357* (2013.01); *H04N 5/2353* (2013.01)
(58) Field of Classification Search
   CPC .... H04N 5/2357; H04N 5/2353; H04N 5/772; H04N 5/9201
   See application file for complete search history.

(56) References Cited

U.S. PATENT DOCUMENTS

| | | | |
|---|---|---|---|
| 8,804,004 B2 * | 8/2014 | Kato | ................... H04N 5/2357 348/229.1 |
| 2003/0107664 A1 | 6/2003 | Suzuki | |
| 2016/0344933 A1 | 11/2016 | Mukai et al. | |

FOREIGN PATENT DOCUMENTS

| | | |
|---|---|---|
| JP | 2002-165141 A | 6/2002 |
| JP | 2009-105693 A | 5/2009 |

(Continued)

OTHER PUBLICATIONS

International Search Report issued in PCT/JP2019/041617; dated Jan. 7, 2020.

(Continued)

*Primary Examiner* — Sinh Tran
*Assistant Examiner* — Angel L Garces-Rivera
(74) *Attorney, Agent, or Firm* — Studebaker & Brackett PC

(57) ABSTRACT

An image capturing device includes an image capturing section that captures first video data having a frame cycle of a first frame cycle and an exposure time for one frame shorter than the first frame cycle, an image acquisition section that acquires the first video data captured by the image capturing section, a detection section that detects a flicker of a light source in the first video data, and an image capturing frame cycle control section that controls the frame cycle of the image capturing in the image capturing section. The image capturing frame cycle control section changes the frame cycle of the first video data captured by the image capturing section from the first frame cycle to a second frame cycle, which is a frame cycle shorter than the first frame cycle, in a case where the detection section detects the flicker.

20 Claims, 14 Drawing Sheets

(56) References Cited

FOREIGN PATENT DOCUMENTS

| JP | 2009-147806 A | 7/2009 |
| JP | 2010-103746 A | 5/2010 |
| JP | 2014-007622 A | 1/2014 |
| JP | 2016-032214 A | 3/2016 |
| JP | 2016-032303 A | 3/2016 |
| JP | 2018-133826 A | 8/2018 |

OTHER PUBLICATIONS

International Preliminary Report on Patentability and Written Opinion issued in PCT/JP2019/041617; dated Jul. 27, 2021.

* cited by examiner

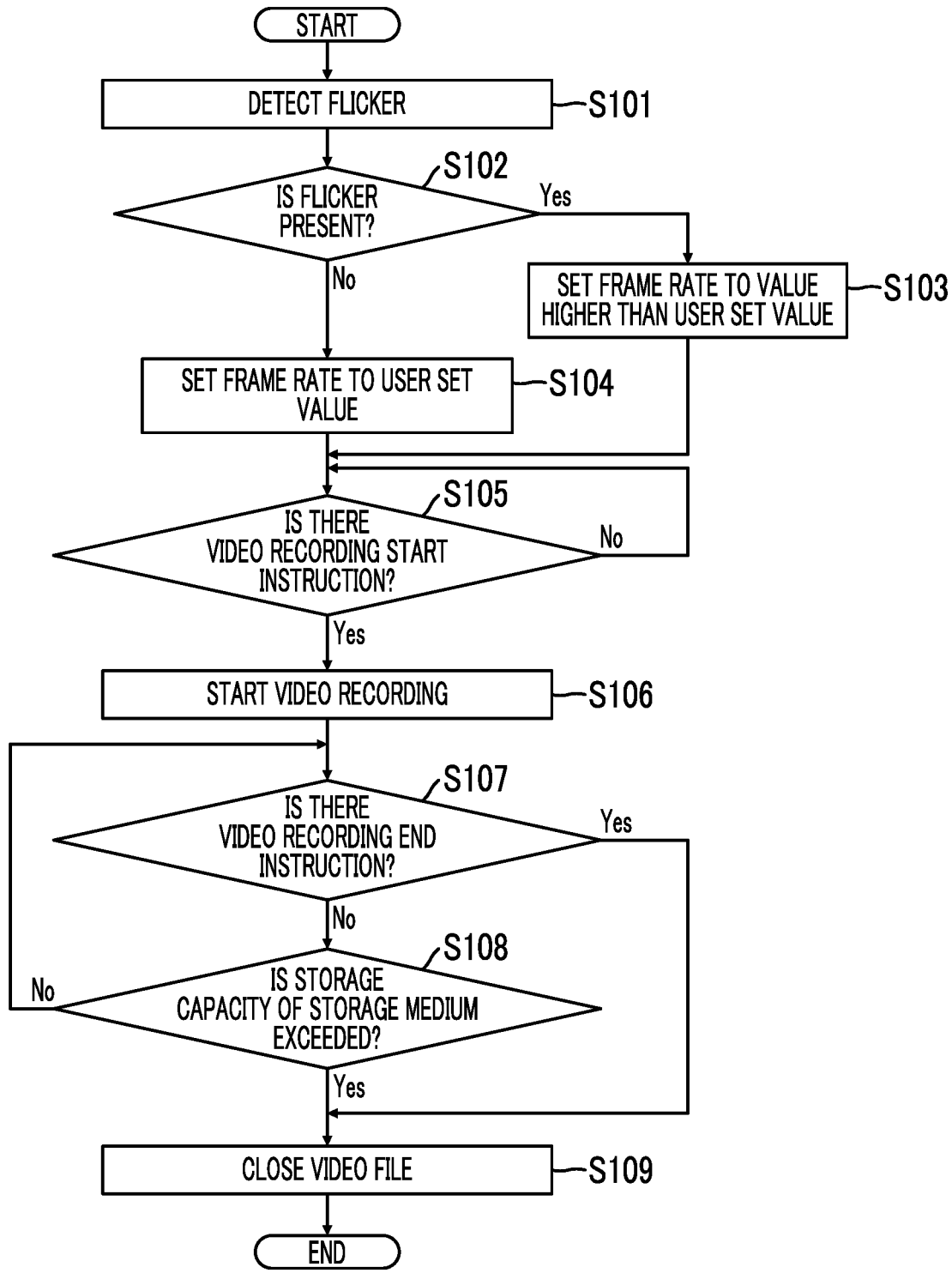

IMAGE CAPTURING DEVICE, IMAGE CAPTURING METHOD, AND PROGRAM

CROSS-REFERENCE TO RELATED APPLICATIONS

This application is a Continuation of PCT International Application No. PCT/JP2019/041617 filed on Oct. 24, 2019, which claims priority under 35 U.S.C. § 119 (a) to Japanese Patent Application No. 2019-013238 filed on Jan. 29, 2019. Each of the above application(s) is hereby expressly incorporated by reference, in its entirety, into the present application.

BACKGROUND OF THE INVENTION

1. Field of the Invention

The present invention relates to an image capturing device, an image capturing method, and a program, and more particularly to techniques of an image capturing device, an image capturing method, and a program used under an environment where a flicker of a light source occurs.

2. Description of the Related Art

It has been known that a flicker of a light source (hereinafter, simply referred to as flicker) occurs in a case where image capturing is performed under an environment of a fluorescent lamp or a light emitting diode (LED) light source. For this reason, a technique of suppressing the influence of the flicker in the image capturing has been studied.

For example, JP2002-165141A proposes a technique in which a frequency A of illumination is detected and a frame rate is set at a timing satisfying 2A/n (n is a natural number) to suppress the influence of the flicker.

For example, JP2018-133826A proposes a technique in which light amount change characteristics of the flicker are detected and a shutter is operated based on the light amount change to suppress the influence of the flicker.

On the other hand, in recent years, an image capturing device having a video capturing mode for capturing a video for static image extraction is proposed in order to capture a momentary scene of a subject. In a technique described in JP2016-032303A, an exposure time for one frame of the video for static image extraction is set shorter than that of a normal video, for example.

SUMMARY OF THE INVENTION

The video capturing mode for capturing the video for static image extraction described above is susceptible to the influence of the flicker since the exposure time for one frame is set short. Under the influence of the flicker, a part of the captured frame may become a dark picture or a tint may be deteriorated. Therefore, it is necessary to suppress the influence of the flicker even in the video capturing mode for capturing the video for static image extraction.

In the video capturing mode for capturing the video for static image extraction, a user selects a desired frame from a captured frame group. From this feature, a probability that the desired frame is a frame in which a scene desired by the user is captured and in which the influence of the flicker is suppressed is higher as the number of frames in which the influence of the flicker is suppressed is larger.

In the above-mentioned JP2002-165141A to JP2016-032303A, there is no mention of a method of suppressing the influence of the flicker in capturing the video for static image extraction.

The present invention has been made in view of such circumstances, and an object of the present invention is to provide an image capturing device, an image capturing method, and a program capable of capturing a large number of frames in which an influence of a flicker is suppressed in capturing a video for static image extraction.

An image capturing device according to an aspect of the present invention comprises an image capturing section that includes a lens and an image capturing element and captures video data having a frame cycle of a first frame cycle, and a processor including an image acquisition section, a detection section, and an image capturing frame cycle control section. The image acquisition section acquires the video data captured by the image capturing section. The detection section detects a flicker of a light source from the video data. The image capturing frame cycle control section controls the frame cycle of the video data captured by the image capturing section. In a case where the image capturing section captures first video data with an exposure time shorter than the first frame cycle, and in a case where the detection section detects the flicker from the first video data, the image capturing frame cycle control section changes the frame cycle of the first video data from the first frame cycle to a second frame cycle, the second frame cycle is a frame cycle shorter than the first frame cycle.

According to this aspect, in a case where the flicker is detected by the detection section, the first video data is captured according to the second frame cycle shorter than the first frame cycle set in advance. Accordingly, in this aspect, it is possible to increase the number of frames in which the influence of the flicker is suppressed in performing the image capturing.

Preferably, the detection section detects a cycle of the flicker, and the image capturing frame cycle control section changes the second frame cycle to a cycle of half or less of the cycle of the flicker detected by the detection section.

Preferably, the image capturing frame cycle control section changes the second frame cycle according to a set exposure time.

Preferably, the processor includes a video data generation section. The video data generation section generates a second video data for recording having a third frame cycle from the first video data, the third frame cycle is longer than the second frame cycle.

Preferably, the video data generation section thins out a part of a plurality of frames constituting the first video data or combines a plurality of adjacent frames in the plurality of frames constituting the first video data to generate the second video data having the third frame cycle.

Preferably, the video data generation section does not change the third frame cycle in a case where the detection section detects the flicker.

Preferably, the processor includes a flicker information acquisition section. The flicker information acquisition section acquires phase information of the flicker detected by the detection section.

Preferably, the image capturing frame cycle control section further adjusts an image capturing timing of the first video data according to the phase information in a case where the detection section detects the flicker.

Preferably, the image capturing section does not perform the image capturing in a specific phase range of the flicker using the phase information.

Preferably, the processor includes a flicker information acquisition section. The flicker information acquisition section acquires phase information of the flicker detected by the detection section. The video data generation section generates the second video data to which the phase information is added.

Preferably, the image capturing device further comprises a monitor that displays the phase information together with frames constituting the second video data.

Preferably, the image capturing device further comprises a monitor. The processor includes an extraction section. The extraction section extracts a frame from a plurality of frames constituting the second video data using the phase information. The monitor displays the frame extracted by the extraction section.

Preferably, the processor includes a flicker information acquisition section. The flicker information acquisition section acquires phase information of the flicker detected by the detection section. The video data generation section selects some frames from a plurality of frames constituting the first video data by using the phase information to generate the second video data.

Preferably, the image capturing section has a first video mode and a second video mode, captures the first video data in the first video mode, and captures third video data in which the exposure time for one frame is set to be longer than the first video data in the second video mode.

Preferably, at least one of a tracking speed of autofocus, a tracking speed of automatic exposure, or a tracking speed of white balance is set high in the first video mode, as compared with the second video mode.

An image capturing device according to another aspect of the present invention comprises an image capturing section that includes a lens and an image capturing element and captures video data having a frame cycle of a first frame cycle, and a processor including an image acquisition section, a detection section, and an image capturing frame cycle control section. The image acquisition section acquires the video data captured by the image capturing section. The detection section detects a flicker of a light source from the video data. The image capturing frame cycle control section controls the frame cycle of the video data captured by the image capturing section. The video data generation section generates video data for recording from the video data captured by the image capturing section. In a case where the image capturing section captures first video data with an exposure time shorter than the first frame cycle, and in a case where the detection section detects the flicker from the first video data, the image capturing frame cycle control section changes a frame cycle of the first video data captured by the image capturing section from the first frame cycle to a second frame cycle, the second frame cycle is a frame cycle shorter than the first frame cycle. The video data generation section generates second video data having a third frame cycle, the third frame cycle is longer than the second frame cycle.

Preferably, the processor includes a flicker information acquisition section. The flicker information acquisition section acquires phase information of the flicker detected by the detection section. The video data generation section generates the second video data to which the phase information is added.

Preferably, the processor includes a flicker information acquisition section. The flicker information acquisition section acquires phase information of the flicker detected by the detection section. The video data generation section selects some frames from the plurality of frames constituting the first video data by using the phase information to generate the second video data.

An image capturing method according to still another aspect of the present invention comprises a step of capturing video data having a frame cycle of a first frame cycle, a step of acquiring the video data captured in the step of capturing, a step of detecting a flicker of a light source from the video data, and a step of controlling the frame cycle of image capturing in the step of capturing. In the step of controlling the frame cycle, in a case where first video data is captured with an exposure time shorter than the first frame cycle in the step of capturing, and in a case where the flicker is detected from the first video data in the step of detecting, the frame cycle of the first video data captured in the step of capturing is changed from the first frame cycle to a second frame cycle, the second frame cycle is a frame cycle shorter than the first frame cycle.

A non-transitory computer readable recording medium storing a program according to further still another aspect of the present invention causing a computer to execute an image capturing process comprising a step of capturing video data having a frame cycle of a first frame cycle, a step of acquiring the video data captured in the step of capturing, a step of detecting a flicker of a light source from the video data, and a step of controlling the frame cycle of image capturing in the step of capturing. In the step of controlling the frame cycle, in a case where first video data is captured with an exposure time shorter than the first frame cycle in the step of capturing, and in a case where the flicker is detected from the first video data in the step of detecting, the frame cycle of the first video data captured in the step of capturing is changed from the first frame cycle to a second frame cycle, the second frame cycle is a frame cycle shorter than the first frame cycle.

According to the present invention, the first video data is captured according to the second frame cycle shorter than the first frame cycle set in advance in the case where the flicker is detected. Therefore, it is possible to increase the number of frames in which the influence of the flicker is suppressed in performing the image capturing.

BRIEF DESCRIPTION OF THE DRAWINGS

FIG. 4 is a flowchart showing an image capturing process.

DESCRIPTION OF THE PREFERRED EMBODIMENTS

Hereinafter, preferred embodiments of an image capturing device, an image capturing method, and a program according to embodiments of the present invention will be described with reference to accompanying drawings. In the following description, captured video data is first video data, and recording video data is second video data. An image capturing frame cycle in a case where a video is captured is composed of a set frame cycle (first frame cycle) and a reset frame cycle (second frame cycle). The image capturing frame cycle and a recording frame cycle (third frame cycle) in a case where a captured video is recorded may be the same or different. Further, a reciprocal of the image capturing frame cycle, a reciprocal of the set frame cycle, a reciprocal of the reset frame cycle, and a reciprocal of the recording frame cycle indicate an image capturing frame rate, a set frame rate, a reset frame rate, and a recording frame rate, respectively.

Figure 1:
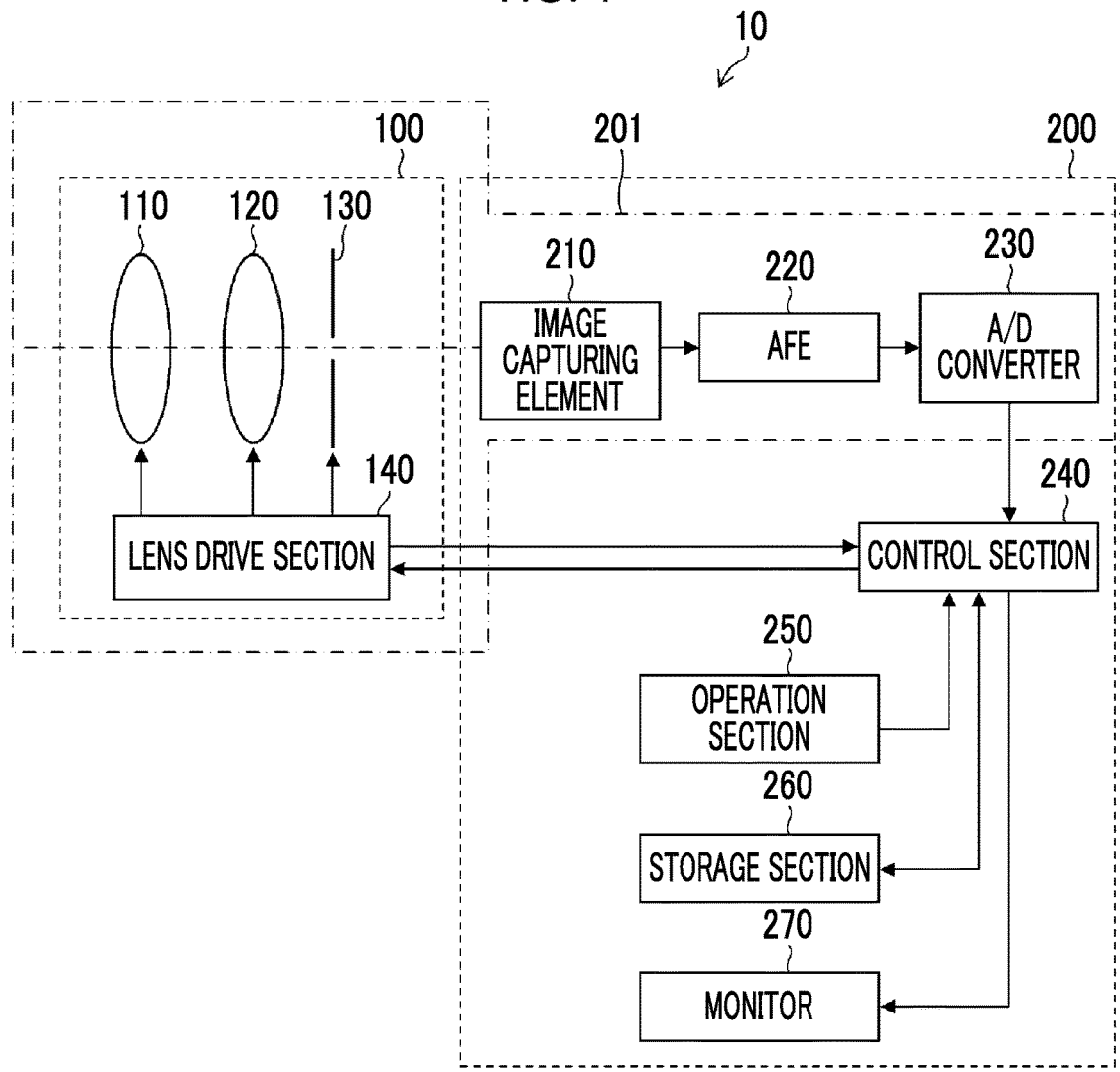
FIG. 1 is a diagram showing a configuration of an image capturing device.

FIG. 1 is a diagram showing a configuration of an image capturing device 10 of the present invention. The image capturing device 10 is composed of an interchangeable lens 100 and an image capturing device body 200, and forms a subject image (optical image) on an image capturing element 210 by an image capturing lens including a zoom lens 110 described below. The interchangeable lens 100 and the image capturing device body 200 can be attached and detached through a mount (not shown).

The interchangeable lens 100 comprises the zoom lens 110, a focus lens 120, a stop 130, and a lens drive section 140. The lens drive section 140 drives the zoom lens 110 and the focus lens 120 forward and backward according to a command from a control section 240 to perform zoom (optical zoom) adjustment and focus adjustment. The zoom adjustment and the focus adjustment may be performed according to a zoom operation and a focus operation (rotation or the like of a zoom ring and a focus ring (not shown)) performed by a user, in addition to the command from the control section 240. The lens drive section 140 controls the stop 130 according to the command from the control section 240 to adjust exposure. On the other hand, information such as positions of the zoom lens 110 and the focus lens 120 and an opening degree of the stop 130 is input to the control section 240.

The image capturing device body 200 comprises the image capturing element 210, an AFE 220 (analog front end: AFE), an A/D converter 230 (analog to digital: A/D), the control section 240, an operation section 250, a storage section 260, and a monitor 270. The image capturing device body 200 may have a mechanical shutter (not shown) for blocking light transmitted through the image capturing element 210. The image capturing element 210 comprises a light receiving surface in which a large number of light receiving elements are arranged in a matrix. An image of subject light transmitted through the zoom lens 110, the focus lens 120, and the stop 130 is formed on the light receiving surface of the image capturing element 210 and is converted into an electric signal by each light receiving element. A color filter of R (red), G (green), or B (blue) is provided on the light receiving surface of the image capturing element 210, and a color image of the subject can be acquired based on a signal of each color. Various photoelectric conversion elements such as a complementary metal-oxide semiconductor (CMOS) and a charge-coupled device (CCD) can be used as the image capturing element 210. The AFE 220 performs noise removal, amplification, and the like of an analog image signal output from the image capturing element 210. The A/D converter 230 converts the captured analog image signal into a digital image signal with a gradation width. The shutter may be a mechanical shutter or an electronic shutter. In the case of the electronic shutter, the control section 240 controls a charge accumulation period of the image capturing element 210, and thus an exposure time (shutter speed) can be adjusted. The image capturing section 201 is composed of the interchangeable lens 100, the image capturing element 210, the AFE 220, and the A/D converter 230, and is controlled by the control section 240.

The image capturing device 10 can set any one of a static image capturing mode, a normal video capturing mode, and a static image extraction video capturing mode as a capturing mode. The static image capturing mode and the normal video capturing mode are the same as those of a normal digital camera. A video having an image capturing condition different from the normal video capturing mode (video having an image capturing condition emphasizing the extraction of the static image rather than viewing the video itself) is captured in the static image extraction video capturing mode. Specifically, in the static image extraction video capturing mode, the shutter speed is set higher (the exposure time is set shorter) than in the normal video capturing mode. In the static image extraction video capturing mode, at least one of a tracking speed of autofocus, a tracking speed of automatic exposure, or a tracking speed of white balance is set higher and/or the frame rate is set higher than that of the normal video capturing mode. Resolution and the frame rate are set to the highest values (for example, 4,000×2,000 pixels, 30 frames/second) that can be set by the image capturing device 10, and a tone is also set on a premise of the static image extraction. An upper limit of ISO sensitivity is also set higher than that of the normal video capturing mode.

For example, the shutter speed (exposure time) is set to a value corresponding to a frame rate of a video (third video data) to be recorded in the normal video capturing mode (1/30 seconds in a case where the frame rate is 30 frames/second), but is set faster (for example, less than 1/30 seconds) than a frame interval in the static image extraction video capturing mode. In the normal video capturing mode, the shutter speed is set to the value corresponding to the frame rate of the video such that a smooth video is played back. However, a moving subject may be blurred in this case. Therefore, the shutter speed is set higher than that of the normal video capturing mode (higher than the frame interval) in the static image extraction video capturing mode, and thus it is possible to extract a high-quality static image with less blurring of the subject. Similarly, it is possible to increase the shutter speed by increasing the upper limit of ISO sensitivity, and thus it is possible to extract a static image with less blurring. The tracking speed of autofocus, the tracking speed of automatic exposure, the tracking speed of auto white balance, or the like is set higher than that of the normal video capturing mode, and thus it is possible to acquire many frames focused on the subject, many frames with appropriate exposure, and the like. The frame interval of the video is shorter by setting the frame rate to the high rate, and thus the number of frames that can be extracted as the static image increases. In the static image extraction video capturing mode, the shutter speed (exposure time) can be set in a P mode (program mode) or an S mode (shutter speed priority) as in the static image capturing mode. In the P mode (program mode), both the shutter speed and an F-number are automatically controlled by the image capturing device 10. On the other hand, in the S mode, the shutter speed is set in advance by the user, and the F-number is automatically controlled by the image capturing device 10.

With the static image extraction video capturing mode described above, it is possible to store the video and extract frames constituting the video as static images. Therefore, the user can easily image a photograph of an event (natural phenomenon, accident, happening, or the like) that does not know when it occurs, a photograph of a momentary state of a subject whose state changes with the passage of time or a moving subject, and the like. At this time, it is possible to extract the static image not only at the timing at which the recording of the static image is instructed but also at another timing. Therefore, the user can acquire the static image at a desired timing. With the setting of the image capturing conditions (shutter speed, resolution, frame rate, and the like described above) suitable for the static image extraction, it is possible to extract a high-quality static image.

The storage section 260 is composed of various magneto-optical recording media, a non-transitory recording medium such as a semiconductor memory, and a control circuit thereof, and stores the video, the static image, the static image extracted from the video, and the like. A recording medium type capable of being attached to and detached from the image capturing device body 200 can be used. Information used for various controls of the program and the control section 240 is stored.

The monitor 270 is composed of a touch panel type liquid crystal display panel and can display the video, the static image, a static image extraction frame, and the like. The monitor 270 can be disposed on a back surface side, a top surface side, or the like of the image capturing device body 200. The image capturing device 10 may comprise a view finder. The view finder is composed of, for example, a liquid crystal display panel, a prism, a lens, and the like, and the user can visually recognize the video, the static image, the static image extraction frame, and the like through an eyepiece section (not shown). An "optical view finder (OVF)", an "electronic view finder (EVF)", or a "hybrid view finder (HVF)" which is a combination of these can be used as the view finder.

The control section 240 reads out a necessary program and the information used for various controls from the storage section 260 to perform various pieces of processing and various controls performed by the control section 240.

A hardware structure of the control section 240 that executes various controls is various processors as shown below. The various processors include, for example, a central processing unit (CPU) which is a general-purpose processor that executes software (program) to function as various function sections, a programmable logic device (PLD) which is a processor whose circuit configuration can be changed after manufacturing such as a field programmable gate array (FPGA), and a dedicated electrical circuitry which is a processor having a circuit configuration specifically designed to execute specific processing such as an application specific integrated circuit (ASIC), and the like.

One processing unit may be composed of one of these various processors or may be composed of two or more processors of the same type or different types (for example, a plurality of FPGAs or a combination of a CPU and an FPGA). A plurality of function sections may be composed by one processor. As an example of constituting the plurality of function sections by one processor, first, there is a form in which one processor is composed of a combination of one or more CPUs and software, as represented by a computer such as a client or a server, and the processor acts as the plurality of function sections. Second, there is a form in which a processor that realizes functions of the entire system including the plurality of function sections by one integrated circuit (IC) chip is used, as represented by a system on chip (SoC) or the like. As described above, various function sections are composed of using one or more of the various processors described above as a hardware structure.

First Embodiment

Figure 2:
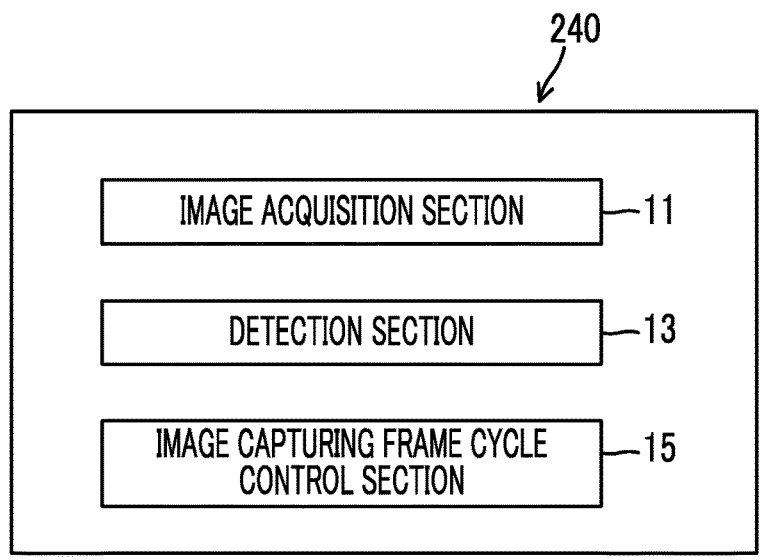
FIG. 2 is a block diagram showing a configuration example of a function realized by a control section.

FIG. 2 is a block diagram showing a configuration example of a function realized by the control section 240.

The control section 240 comprises an image acquisition section 11, a detection section 13, and an image capturing frame cycle control section 15.

The image acquisition section 11 acquires video data (hereinafter referred to as captured video data) captured by the image capturing section 201 (interchangeable lens 100, image capturing element 210, AFE 220, and A/D converter 230). The image capturing section 201 images a video in the normal video capturing mode (first video mode) or the static image extraction video capturing mode (second video mode). In the static image extraction video capturing mode, the image acquisition section 11 acquires the captured video data captured by the image capturing section 201 under a condition that the exposure time of each frame is shorter (the shutter speed is faster) than in the normal video capturing mode.

The detection section 13 detects a flicker from temporal and spatial brightness changes or color changes of the captured video data, which is captured by the image capturing element 210 and is processed and generated by the AFE 220 and the A/D converter 230. The detection section 13 can detect the flicker by a known method, and the method described in JP2018-133826A can be used, for example. The detection section 13 may be composed of detecting a flicker cycle, the brightness change and the color change between the frames constituting the captured video data by the flicker, and an exposure timing of each frame constituting the captured video data with respect to a phase of the flicker under the flicker environment. The detection section 13 detects the flicker based on, for example, a live view image. Further, the detection section 13 may detect the flicker within a predetermined time from a start of video capturing or may sequentially detect the flicker when the brightness of a scene changes during the video capturing.

The image capturing frame cycle control section 15 controls the frame cycle of the image capturing by the image capturing section 201 in the static image extraction video capturing mode. The image capturing frame cycle is composed of the set frame cycle set in advance and the reset frame cycle switched in a case where the detection section 13 detects the flicker. The set frame cycle is, for example, a frame cycle corresponding to a frame rate set by the user before the image capturing. The reset frame cycle is a frame cycle shorter than the set frame cycle. In a case where the detection section 13 detects the flicker, the image capturing frame cycle control section 15 causes the image capturing section 201 to capture the captured video data according to the reset frame cycle.

Figure 3A:
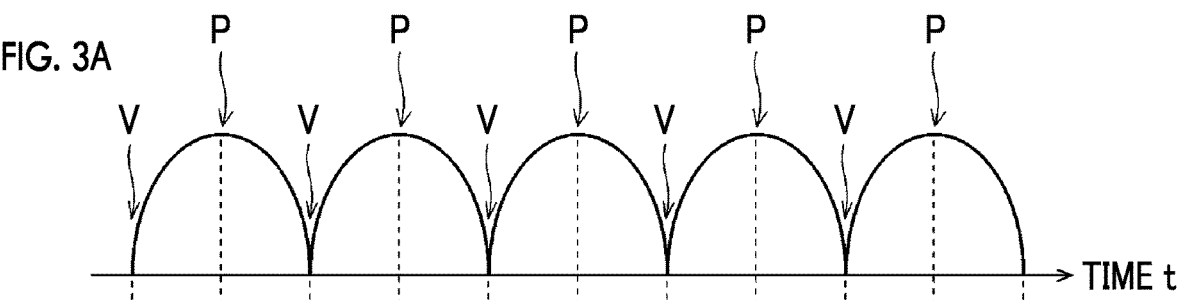
FIGS. 3A to 3C are diagrams showing a flicker cycle and an exposure timing of each frame.
Figure 3B:
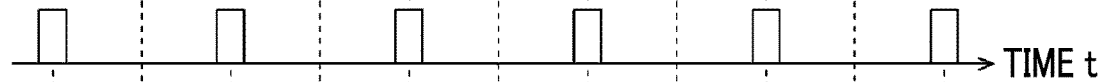
Figure 3C:
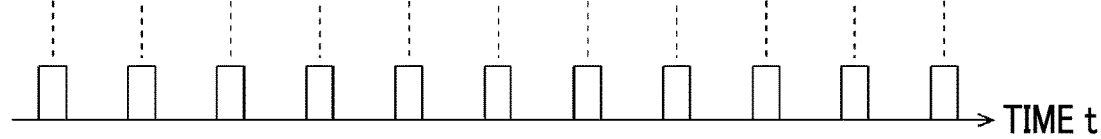

FIGS. 3A to 3C are diagrams showing a flicker cycle and the exposure timing of each frame. FIG. 3A shows a time change of a light amount of the flicker together with a time (t) on a horizontal axis. FIG. 3A shows that a light amount of a light source is the peak at an apex part P of an illustrated curve, and the light amount of the light source is the smallest at a valley part V. FIG. 3B shows the exposure timing of each frame according to the set frame cycle in the static image extraction video capturing mode. In the case of FIG. 3B, a frame obtained in a case where the exposure timing overlaps with the valley part V of the flicker cycle has a small light amount and becomes a dark scene.

FIG. 3C shows the exposure timing of each frame according to the reset frame cycle in the static image extraction video capturing mode. In a case where the detection section 13 detects the flicker, the image capturing frame cycle control section 15 changes the image capturing frame cycle to a reset frame cycle shorter than the set frame cycle. In other words, the image capturing frame cycle control section 15 changes the set frame rate to a faster reset frame rate in the case where the flicker is detected. By obtaining the captured video data according to the reset frame cycle (reset frame rate), a frame to be exposed also immediately before a timing of the apex part P is acquired, as shown in FIG. 3C. Accordingly, it is possible to newly obtain a frame other than the frame captured immediately before a timing of the valley part V, and thus the number of frames captured with scenes having appropriate brightness increases. This can provide the user with more selection candidates of the frames captured with scenes having appropriate brightness. A proportion of a state where the light amount is low (valley part V) in the flicker cycle differs depending on the light source. In the example of FIG. 3A, the light amount is low (valley part V) in the flicker cycle for a short period of time. However, about a half period of the flicker cycle may be occupied by the state where the light amount is low (valley part V) for some LED light sources. Therefore, the reset frame cycle is preferably set to half or less of the set frame cycle. Accordingly, it is possible to suppress the influence of the flicker regardless of a type of the light source. The reset frame cycle may be set according to phase information of the flicker detected by the detection section 13.

Example 1 of First Embodiment

Next, Example 1 of the first embodiment will be described. FIG. 4 is a flowchart showing an image capturing method (image capturing process) using the image capturing device 10.

First, the user sets the static image extraction video capturing mode by using the operation section 250. Thereafter, the detection section 13 detects the flicker in the captured video data (step S101). In a case where the detection section 13 does not detect the flicker (No in step S102), the image capturing frame cycle control section 15 sets the frame rate (set frame rate) set by the user and causes the image capturing section 201 to capture the captured video data (step S104).

On the other hand, in a case where the detection section 13 detects the flicker (Yes in step S102), the image capturing frame cycle control section 15 sets the image capturing frame rate to a frame rate higher than the frame rate set by the user (reset frame rate) (step S103). That is, the image capturing frame cycle control section 15 changes the set frame cycle to the reset frame cycle with a shorter cycle and causes the image capturing section 201 to capture the captured video data. In a case where the frame rate is changed as described above, the monitor 270 may notify the user of the change.

Thereafter, the control section 240 determines whether or not there is a video recording start instruction from the user (step S105) and starts video recording in a case where there is the video recording start instruction (step S106). Next, the control section 240 determines whether or not there is a video recording end instruction (step S107) and performs closing processing of a video file (step S109) in a case where there is the video recording end instruction (Yes in step S107). In a case where there is no video recording end instruction (No in step S107), the control section 240 determines whether or not the video recording exceeds a storage capacity of a storage medium (step S108) and performs the closing processing of the video file in a case where the video recording exceeds the storage capacity thereof (step S109).

As described above, in the case where the video is captured in the static image extraction video capturing mode of the image capturing device 10, the first video data is captured according to the reset frame cycle shorter than the set frame cycle in the case where the flicker is detected. The captured video data captured as described above includes more frames in which the influence of the flicker is suppressed than the captured video data captured in the set frame cycle. Therefore, it is possible for the user to extract a desired static image from more frames in which the influence of the flicker is suppressed.

Example 2 of First Embodiment

Next, Example 2 of the first embodiment will be described. In this example, in the case where the flicker is detected, the set frame cycle is changed to the reset frame cycle determined according to a set exposure time.

Figure 5:
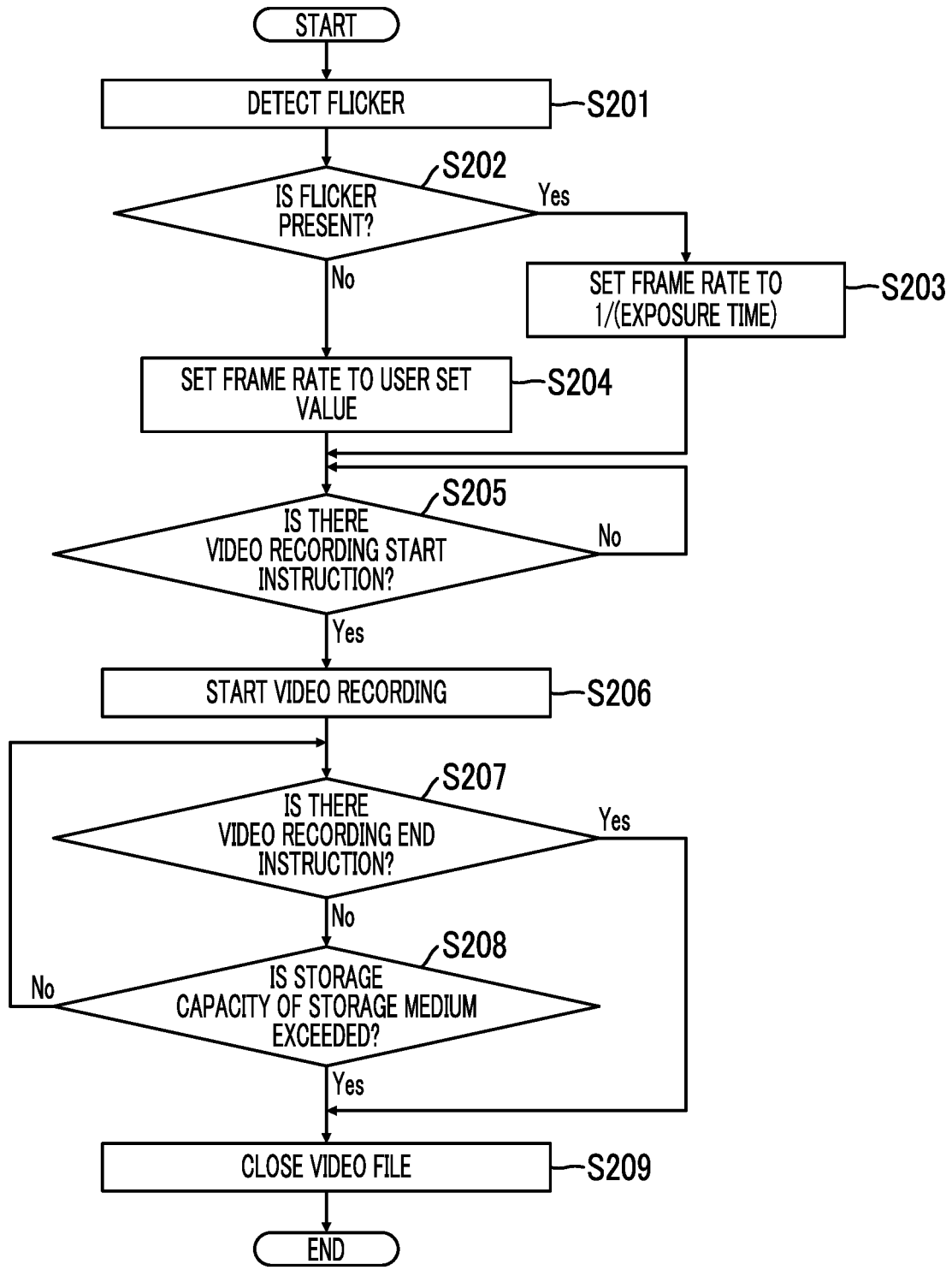
FIG. 5 is a flowchart showing an image capturing process.

FIG. 5 is a flowchart showing an image capturing method (image capturing process) using the image capturing device 10 of this example.

First, the user sets the static image extraction video capturing mode by using the operation section 250. Thereafter, the detection section 13 detects the flicker in the captured video data (step S201). In a case where the detection section 13 does not detect the flicker (No in step S202), the image capturing frame cycle control section 15 sets the frame rate set by the user and causes the image capturing section 201 to capture the captured video data (step S204).

On the other hand, in a case where the detection section 13 detects the flicker (Yes in step S202), the image capturing frame cycle control section 15 sets the image capturing frame rate to a frame rate higher than the frame rate set by the user and having "1/exposure time" (step S203). That is, in the case where the flicker is detected, the image capturing frame cycle control section 15 changes the set frame cycle to a reset frame cycle of the exposure time set in advance.

As described above, a short exposure time is generally set in the static image extraction video capturing mode. The exposure time is set, for example, from $1/125$ seconds to $1/500$ seconds depending on the scene to be captured. The image capturing frame cycle control section 15 changes the set frame cycle to the reset frame cycle in which the set exposure time becomes the frame cycle. In a case where the set exposure time is shorter than a minimum frame cycle that can be set by the device, the image capturing frame cycle control section 15 sets the reset frame cycle to the minimum frame cycle that can be set. Since the exposure time is set short in the static image extraction video capturing mode, a second frame cycle set in this manner is a reset frame cycle shorter than a set frame cycle set in advance.

Thereafter, the control section 240 determines whether or not there is the video recording start instruction from the user (step S205) and starts the video recording in the case where there is the video recording start instruction (step S206). Next, the control section 240 determines whether or not there is the video recording end instruction (step S207) and performs the closing processing of the video file (step S209) in the case where there is the video recording end instruction (Yes in step S207). In a case where there is no video recording end instruction (No in step S207), the control section 240 determines whether or not the video recording exceeds a storage capacity of a storage medium (step S208) and performs the closing processing of the video file in the case where the video recording exceeds the storage capacity thereof (step S209).

As described above, in this example, in the case where the flicker is detected, the set frame cycle is changed to the reset frame cycle, which is the exposure time set in the static image extraction video capturing mode. Therefore, it is possible to obtain more frames that are exposed at the exposure time set by the user and that have suppressed the flicker influence.

Second Embodiment

Next, a second embodiment will be described. In this embodiment, the image capturing frame rate and the recording frame rate are controlled independently. The recording frame rate is a frame rate of video data (hereinafter referred to as recording video data) stored in the storage section 260.

Figure 6:
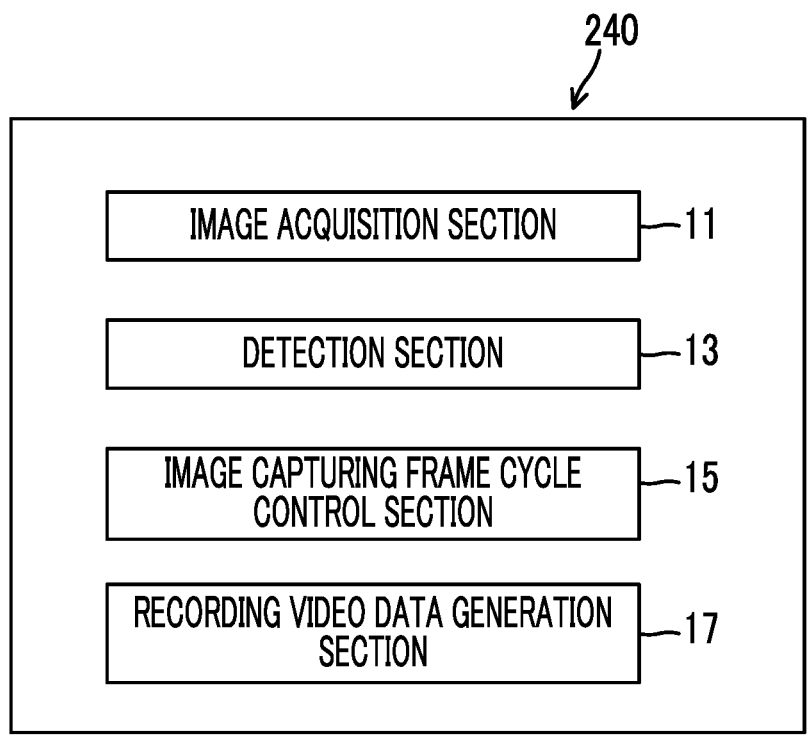
FIG. 6 is a block diagram showing a configuration example of a function realized by a control section.

FIG. 6 is a block diagram showing a configuration example of a function realized by the control section 240. The parts already described in FIG. 2 are designated by the same reference numerals and the description thereof will be omitted.

The control section 240 comprises the image acquisition section 11, the detection section 13, the image capturing frame cycle control section 15, and a recording video data generation section 17.

The recording video data generation section 17 processes the video data captured by the image capturing element 210 to generate the recording video data for recording. Specifically, the recording video data generation section 17 acquires the captured video data of the reset frame cycle to generate the recording video data changed to a recording frame cycle longer than the reset frame cycle. In a case where the recording video data is stored in the storage section 260, the recording video data generation section 17 changes to the recording frame cycle by thinning out the frame of the captured video data captured in the reset frame cycle to generate the recording video data. In the case where the recording video data is stored in the storage section 260, the recording video data generation section 17 changes to the recording frame cycle by synthesizing adjacent frames of the captured video data captured in the reset frame cycle to generate the recording video data of the recording frame cycle. The recording video data generation section 17 temporarily stores the captured video data in the storage section 260 as it is, rewrites information regarding a playback frame cycle of the recording video data, and thus can change the reset frame cycle to the recording frame cycle. For example, header information or time code information of the recording video data is rewritten such that the playback is performed in the recording frame cycle to change the reset frame cycle to the recording frame cycle.

In this embodiment, for example, in the static image extraction video capturing mode, the set frame cycle of the captured video data and the recording frame cycle of the recording video data are set to the same value in advance, and only the frame cycle of the captured video data is changed from the set frame cycle to the reset frame cycle shorter than the set frame cycle in the case where a flicker is detected. For example, in a case where the frame cycles of the captured video data and the recording video data are set to $1/30$ seconds, the frame cycle (reset frame cycle) of the captured video data is set to $1/120$ seconds in the case where the flicker is detected, and the video data generation section generates the recording video data having a frame cycle (recording frame cycle) of $1/30$ seconds from the captured video data acquired in the frame cycle $1/120$ seconds. Accordingly, it is possible to suppress the influence of the flicker and at the same time, to set the frame rate of the recording video data in accordance with the generally used a video standard (24 fps/25 fps/30 fps/60 fps, or the like). Accordingly, the recording video data can be handled by a general-purpose computer application, and the versatility is improved. In the above example, the recording frame cycle is not changed in the case where the flicker is detected. However, the frame cycle may be changed to a frame cycle selected in advance by the user from options prepared in advance (24 fps/25 fps/30 fps/60 fps, and the like).

Example 1 of Second Embodiment

Figure 7:
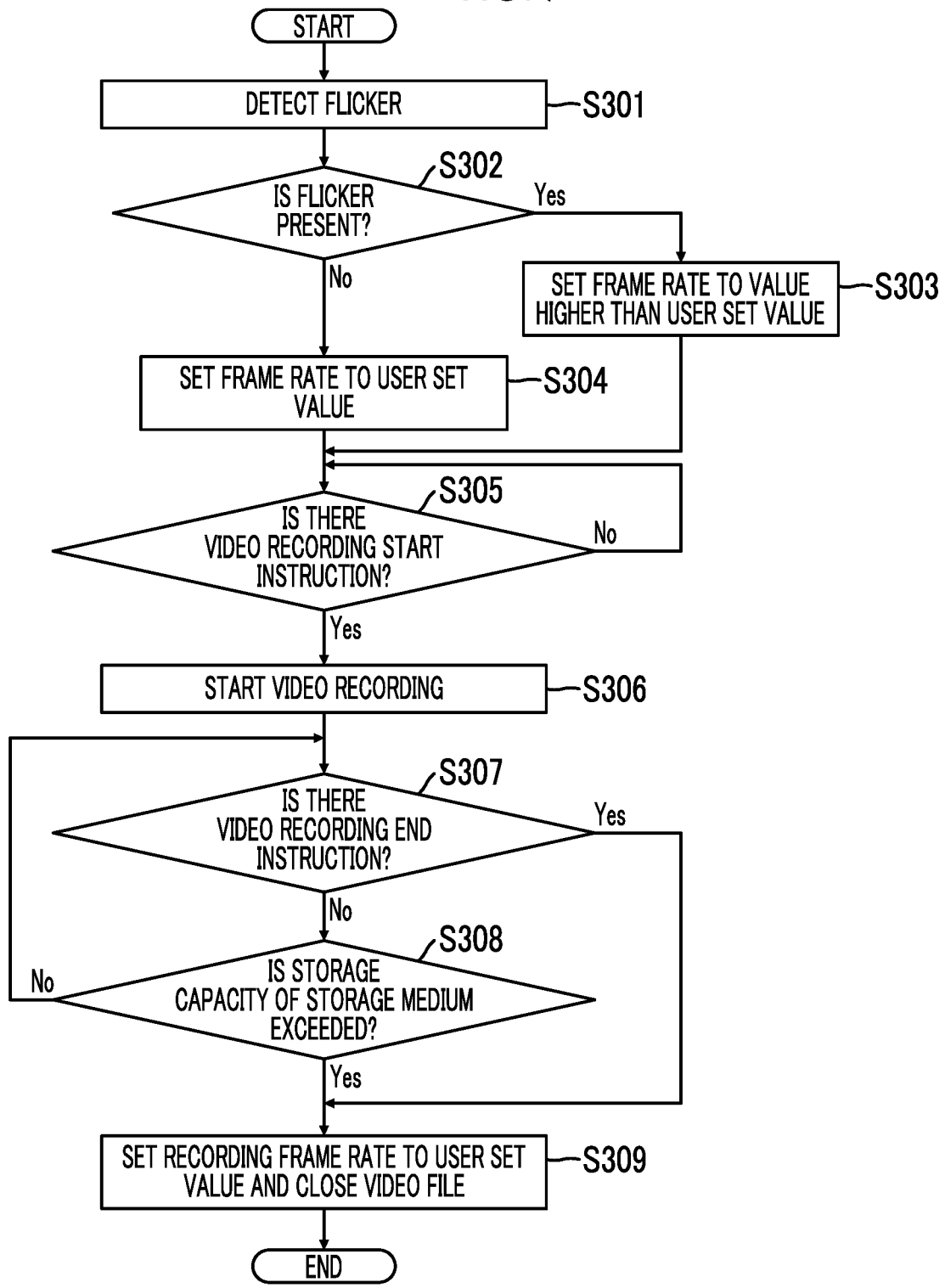
FIG. 7 is a flowchart showing an image capturing process.

Next, Example 1 of the second embodiment will be described. FIG. 7 is a flowchart showing an image capturing method (image capturing process) using the image capturing device 10 of this example. In this example, the recording video data generation section 17 rewrites the playback frame cycle in the header information of the recording video data to change the reset frame cycle to the recording frame cycle.

First, the user sets the static image extraction video capturing mode by using the operation section 250. Thereafter, the detection section 13 detects the flicker in the captured video data (step S301). In a case where the detection section 13 does not detect the flicker (No in step S302), the image capturing frame cycle control section 15 sets the frame rate set by the user and causes the image capturing section 201 to capture the captured video data (step S304).

On the other hand, in a case where the detection section 13 detects the flicker (Yes in step S302), the image capturing frame cycle control section 15 sets the image capturing frame rate to a frame rate (reset frame rate) higher than the frame rate set by the user (set frame rate) (step S303).

Thereafter, the recording video data generation section 17 determines whether or not there is the video recording start instruction from the user (step S305) and starts the video recording in the case where there is the video recording start instruction (step S306). That is, the recording video data generation section 17 starts generating the recording video data.

Next, the recording video data generation section 17 determines whether or not there is the video recording end instruction (step S307). In a case where there is the video recording end instruction (Yes in step S307), the recording video data generation section 17 sets the recording frame rate to a frame rate set in advance by the user to perform the closing processing of the video file (step S309). Specifically, the recording video data generation section 17 rewrites the header information of the video file such that the playback is performed at the frame rate set in advance by the user to change the reset frame rate (reset frame cycle) to the recording frame cycle (recording frame rate).

In a case where there is no video recording end instruction (No in step S307), the recording video data generation section 17 determines whether or not the recording of the recording video data exceeds the storage capacity of the storage medium (step S308). In the case where the storage capacity is exceeded, the recording video data generation section 17 sets the recording frame rate to the frame rate set by the user to perform the closing processing of the video file as described above (step S309).

In the case where the detection section 13 detects the flicker and the frame rate of the captured video data is changed from the set frame rate (set frame cycle) set in advance to the reset frame rate (reset frame cycle), the reset frame rate (reset frame cycle) after the change may be a frame cycle that is not generally used as the video standard. In this example, even in such a case, it is possible to set the frame rate of the recording video data in accordance with the generally used video standard (24 fps/30 fps/60 fps, and the like). Accordingly, the recording video data can be handled by a general-purpose computer application, and the versatility is improved.

Third Embodiment

Next, a third embodiment will be described. In this embodiment, the phase information of the flicker is acquired.

Figure 8:
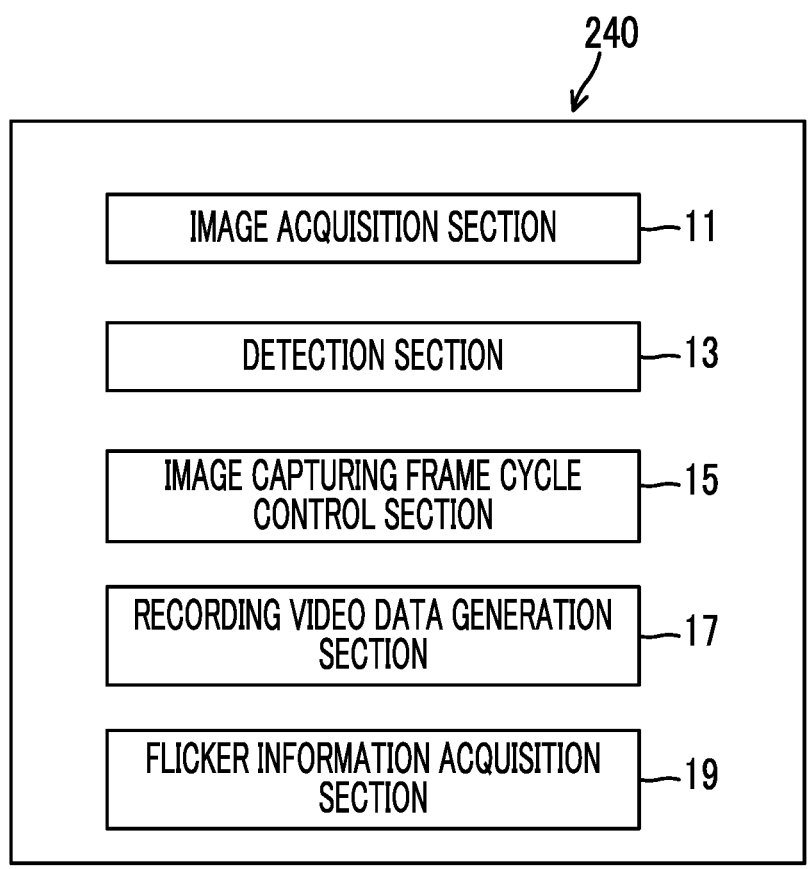
FIG. 8 is a block diagram showing a configuration example of a function realized by a control section.

FIG. 8 is a block diagram showing a configuration example of a function realized by the control section 240. The parts already described in FIGS. 2 and 6 are designated by the same reference numerals and the description thereof will be omitted.

The control section 240 comprises the image acquisition section 11, the detection section 13, the image capturing frame cycle control section 15, the recording video data generation section 17, and a flicker information acquisition section 19.

The flicker information acquisition section 19 acquires the phase information regarding the phase of the flicker detected by the detection section 13. The phase information includes various pieces of information related to the flicker. For example, the phase information includes information about the flicker cycle, the brightness change due to the flicker, the color change due to the flicker, and the exposure timing of the frame under the flicker environment. The phase information may include light source information (LED or fluorescent lamp) of the subject estimated from the flicker cycle, the brightness change due to the flicker, and the like.

Example 1 of Third Embodiment

Next, Example 1 of the third embodiment will be described. In this example, the phase information for each frame is acquired and is saved in association with each frame. Then, the phase information can be referred to in the case where the static image is extracted in the static image extraction video capturing mode to assist the user to extract the static image. In this case, the recording video data generation section 17 generates the recording video data to which the phase information is added.

Figure 9:
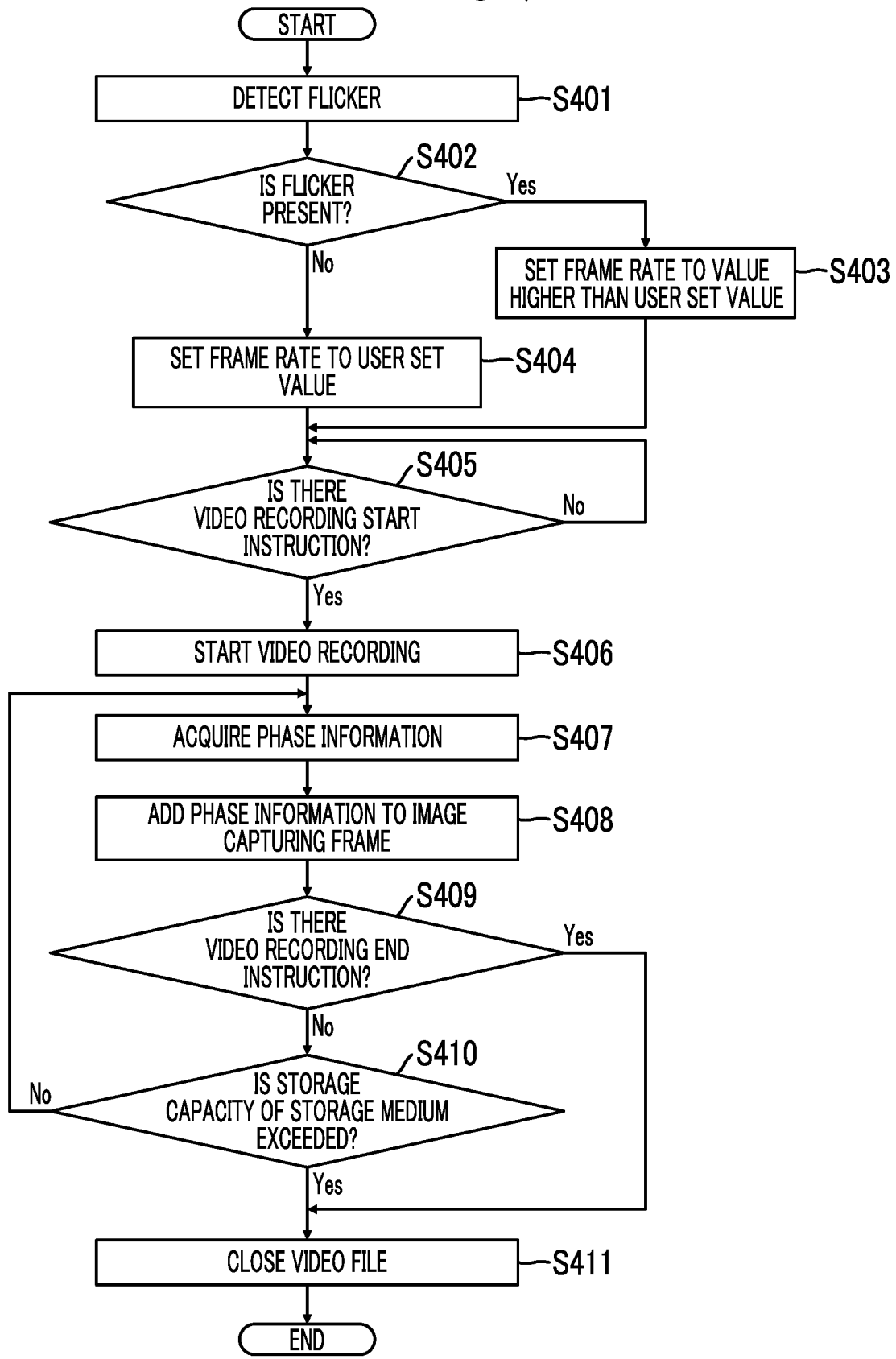
FIG. 9 is a flowchart showing an image capturing process.

FIG. 9 is a flowchart showing an image capturing method (image capturing process) using the image capturing device 10.

First, the user sets the static image extraction video capturing mode by using the operation section 250. Thereafter, the detection section 13 detects the flicker in the captured video data (step S401). In a case where the detection section 13 does not detect the flicker (No in step S402), the image capturing frame cycle control section 15 sets the frame rate set by the user and causes the image capturing section 201 to capture the captured video data (step S404).

On the other hand, in a case where the detection section 13 detects the flicker (Yes in step S402), the image capturing frame cycle control section 15 sets the image capturing frame rate to a frame rate (reset frame rate) higher than the frame rate (set frame rate) set by the user (step S403).

Thereafter, the recording video data generation section 17 determines whether or not there is the video recording start instruction from the user (step S405) and starts the video recording in the case where there is the video recording start instruction (step S406).

Next, the flicker information acquisition section 19 acquires the phase information (step S407). The flicker information acquisition section 19 acquires the phase information based on the detection result of the detection section 13. The recording video data generation section 17 generates the recording video data in which the phase information is added to each frame (step S408).

Next, the recording video data generation section 17 determines whether or not there is the video recording end instruction (step S409) and performs the closing processing of the video file (step S411) in the case where there is the video recording end instruction (Yes in step S409). In a case where there is no video recording end instruction (No in step S409), the recording video data generation section 17 determines whether or not the video recording exceeds a storage capacity of a storage medium (step S410) and performs the closing processing of the video file in the case where the video recording exceeds the storage capacity thereof (step S411).

As described above, the phase information is saved in association with each frame of the recording video data, and thus the associated phase information can be referred to in the case where the user extracts the static image. Therefore, it is possible to provide information about the presence or absence of the flicker. Accordingly, it is possible to assist the user to extract the static image.

Example 2 of Third Embodiment

Next, Example 2 of the third embodiment will be described. In this example, in a case where there is the phase information associated with each frame, the presence or absence of the flicker is determined from the information, and the result is displayed on an extraction candidate frame in an overlapped manner. Notification of whether or not the flicker has occurred is made to the user in the case where the static image is extracted to assist the user to select the static image extraction.

The monitor (display section) 270 (FIG. 1) displays the phase information on the monitor 270 together with the recording video data. For example, the monitor 270 displays the phase information on the frames constituting the recording video data in an overlapped manner. The monitor 270 may extract the frame from a plurality of frames constituting the recording video data using the phase information by an extraction section (not shown) provided in the control section 240 and display the extracted frames. For example, the extraction section determines a light or dark state of the light source in each frame based on the phase information to extract a frame in a bright state.

Figure 10:
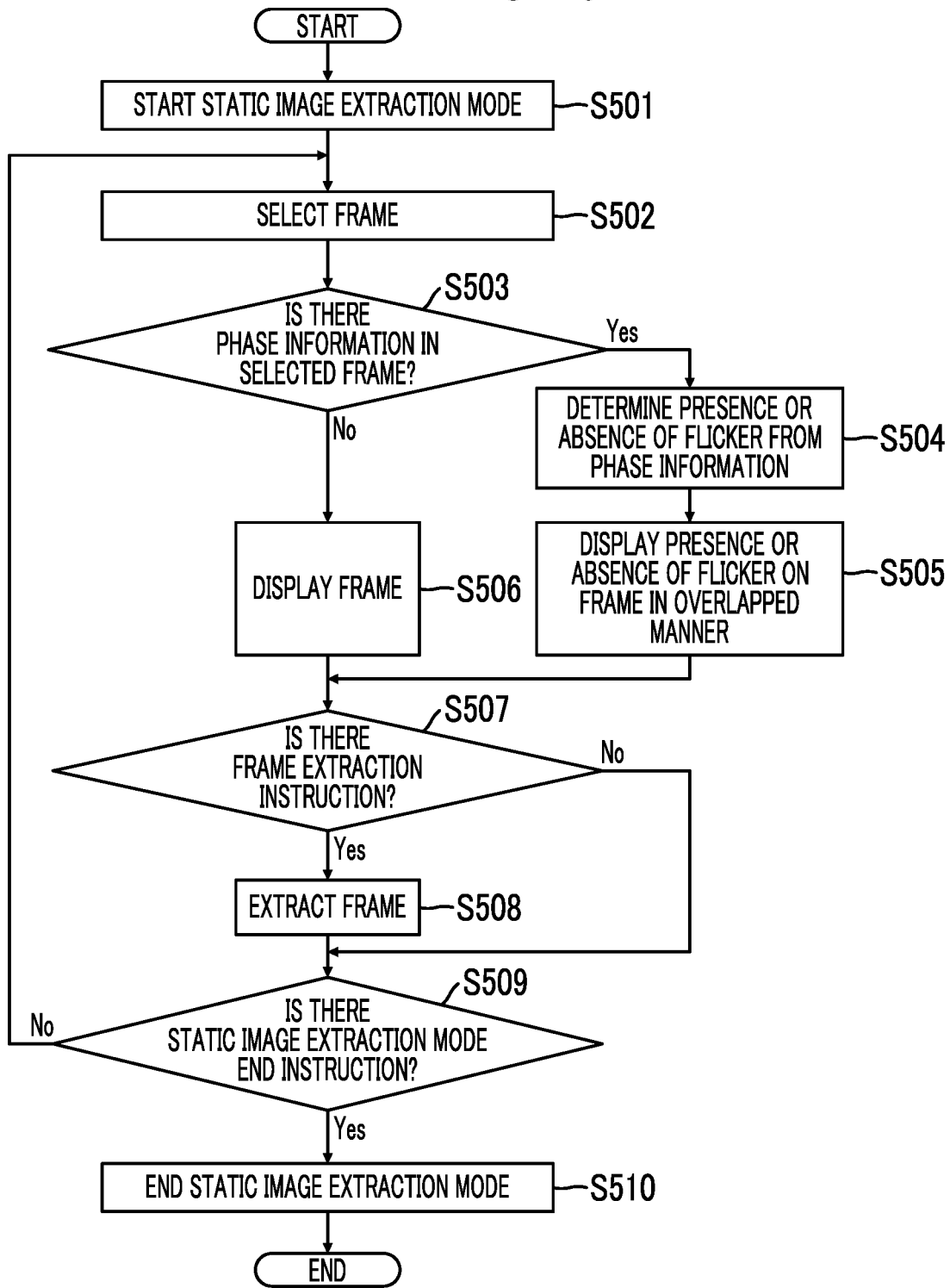
FIG. 10 is a flowchart showing a step of extracting a static image.

FIG. 10 is a flowchart showing a step of extracting the static image from the frame constituting the recording video data.

First, the control section 240 starts a static image extraction mode (step S501). Thereafter, the frames constituting the recording video data are sequentially displayed on the monitor 270, and the user selects the frame (static image) through the operation section 250 (step S502). Next, the flicker information acquisition section 19 determines whether or not there is the phase information in the selected frame (step S503). In a case where the flicker information acquisition section 19 determines that there is no phase information in the selected frame, the monitor 270 displays the selected frame without displaying the phase information (step S506).

On the other hand, in a case where the flicker information acquisition section 19 determines that there is the phase information in the selected frame, the flicker information acquisition section 19 determines the light or dark state of the light source that illuminates the subject from the phase information (step S504). Specifically, in a case where the brightness change or the color change is acquired as the phase information, the light or dark state of the light source is determined based on a threshold value. Even in a case where the flicker cycle or the exposure timing is acquired as the phase information, the light or dark state of the flicker may be determined from these pieces of information.

Thereafter, the monitor 270 displays information indicating the light or dark state of the light source that illuminates the subject on the frame in an overlapped manner (step S505). Thereafter, in a case where an instruction to extract the frame is issued through the operation section 250 (Yes in step S507), the recording video data generation section 17 extracts a frame receiving the instruction (step S508). In this case, the monitor 270 may display the extracted frame. Thereafter, in a case where the user issues an instruction to end the static image extraction mode through the operation section 250, the control section 240 ends the static image extraction mode (steps S509 and S510).

As described above, the light or dark state of the light source is determined using the phase information associated with each frame constituting the recording video data, and the result is displayed on the extraction candidate frame in an overlapped manner. Accordingly, it is possible to assist the user to extract the static image. In this example, the light or dark state of the light source is displayed on the extraction candidate frame in an overlapped manner. However, in a case where the flicker information acquisition section 19 determines that the light source is in a dark state from the phase information (step S504), frames in which the light sources before and after the selected frame are in the bright state may be displayed instead of the selected frame. Accordingly, it is possible for the user to extract the static image in which the light source is in the bright state, in a case where the flicker is present.

Example 3 of Third Embodiment

Next, Example 3 of the third embodiment will be described. In this example, the frame used for the recording video data is selected by using the acquired phase information.

Figure 11:
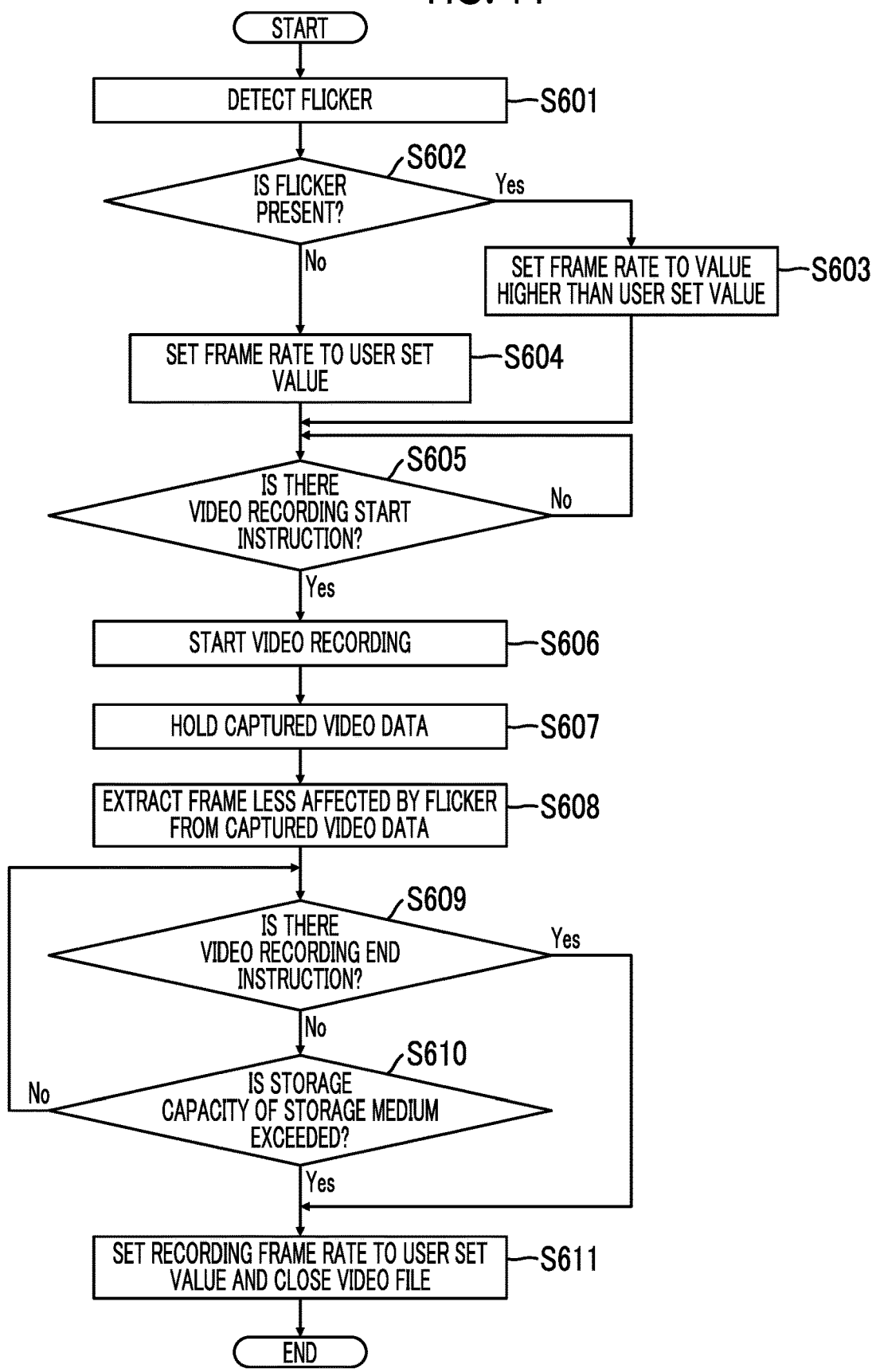
FIG. 11 is a flowchart showing an image capturing process.

FIG. 11 is a flowchart showing an image capturing method (image capturing process) using the image capturing device 10.

First, the user sets the static image extraction video capturing mode by using the operation section 250. Thereafter, the detection section 13 detects the flicker in the captured video data (step S601). In a case where the detection section 13 does not detect the flicker (No in step S602), the image capturing frame cycle control section 15 sets the frame rate set by the user and causes the image capturing section 201 to capture the captured video data (step S604).

On the other hand, in a case where the detection section 13 detects the flicker (Yes in step S602), the image capturing frame cycle control section 15 sets the image capturing frame rate to a frame rate (reset frame rate) higher than the frame rate (set frame rate) set by the user (step S603).

Thereafter, the recording video data generation section 17 determines whether or not there is the video recording start instruction from the user (step S605) and starts the video recording in the case where there is the video recording start instruction (step S606).

Next, the recording video data generation section 17 holds the captured video data (step S607). The holding means temporary saving or storage and is performed using the storage section 260. Thereafter, the recording video data generation section 17 extracts a frame less affected by the flicker from the frames constituting the held captured video data by referring to the phase information (step S608). Specifically, the recording video data generation section 17 determines the light or dark state of the light source in each frame based on the phase information to extract the frame in the bright state. For example, even in a case where the reset frame rate is set at 60 fps, the recording frame rate is set to 30 fps in a case where the frame rate (set frame rate) set by the user is 30 fps. In such a case, the frames for generating the recording video data of 30 fps from the captured video data of 60 fps are selected in order from a frame of a higher rank.

Next, the recording video data generation section 17 determines whether or not there is the video recording end instruction (step S609) and performs the closing processing of the video file (step S611) with the recording frame rate as a user set value in the case where there is the video recording end instruction (Yes in step S609). In the case where there is no video recording end instruction (No in step S607), the control section 240 determines whether or not the video recording exceeds a storage capacity of a storage medium (step S610) and performs the closing processing of the video file in the case where the video recording exceeds the storage capacity thereof (step S611).

As described above, with the extraction of the frames constituting the recording video data based on the phase information, it is possible to efficiently use the storage capacity and it is possible for the user to efficiently select the static image.

Example 4 of Third Embodiment

Next, Example 4 of the third embodiment will be described. In this example, the exposure of the frame is performed only in a specific phase range or recording video data is composed of a frame having only a specific phase range.

In the static image extraction video capturing mode, it is premised that the frame (static image) is extracted from the frames constituting the recording video data. Therefore, it is not always necessary to acquire the frame at equal intervals. Therefore, in this example, it is controlled such that the exposure is not performed at a timing that the light source becomes dark due to the flicker or such that the frame is not used for the recording video data even in a case where the exposure is performed.

Figure 12:
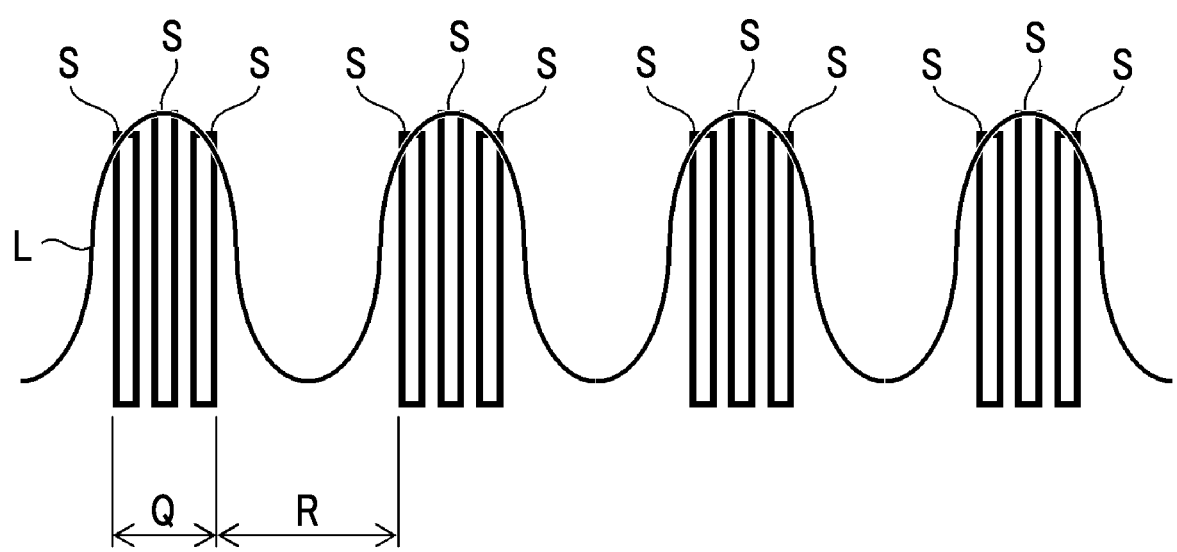
FIG. 12 is a diagram for describing that exposure of a frame is performed only in a specific phase range or recording video data is composed of a frame having only a specific phase range.

FIG. 12 is a diagram for describing that exposure of a frame is performed only in a specific phase range or recording video data is composed of a frame having only a specific phase range. As shown in FIG. 12, the flicker information acquisition section 19 obtains a characteristic curve L indicating change characteristics of the light amount of the light source due to the flicker as the phase information. The image capturing section 201 does not perform the image capturing in a specific range based on the phase information. Specifically, the image capturing section 201 does not perform the image capturing in an unnecessary phase range R even in a case where the image capturing is performed at the reset frame rate. On the other hand, the image capturing section 201 performs image capturing S based on the reset frame rate in a peak phase range Q. The recording video data generation section 17 generates the recording video data by using only the frame obtained by performing the image capturing S in the peak phase range Q without using the frame captured in the unnecessary phase range R. In this case, information about the flicker phase and the image capturing timing is associated with each frame as the phase information.

As described above, the exposure of the frame is performed only in the specific phase range or recording video data is composed of the frame having only a specific phase range. Therefore, it is possible to efficiently use the storage capacity.

Example 5 of Third Embodiment

Next, Example 5 of the third embodiment will be described. In this example, the image capturing timing in the reset frame cycle is controlled based on the phase information.

The image capturing frame cycle control section 15 controls the image capturing timing in the reset frame cycle based on the flicker phase as the phase information. Specifically, the image capturing frame cycle control section 15 sets the set frame cycle to a shorter reset frame cycle and shifts the image capturing timing in the reset frame cycle from the flicker phase.

Figure 13:
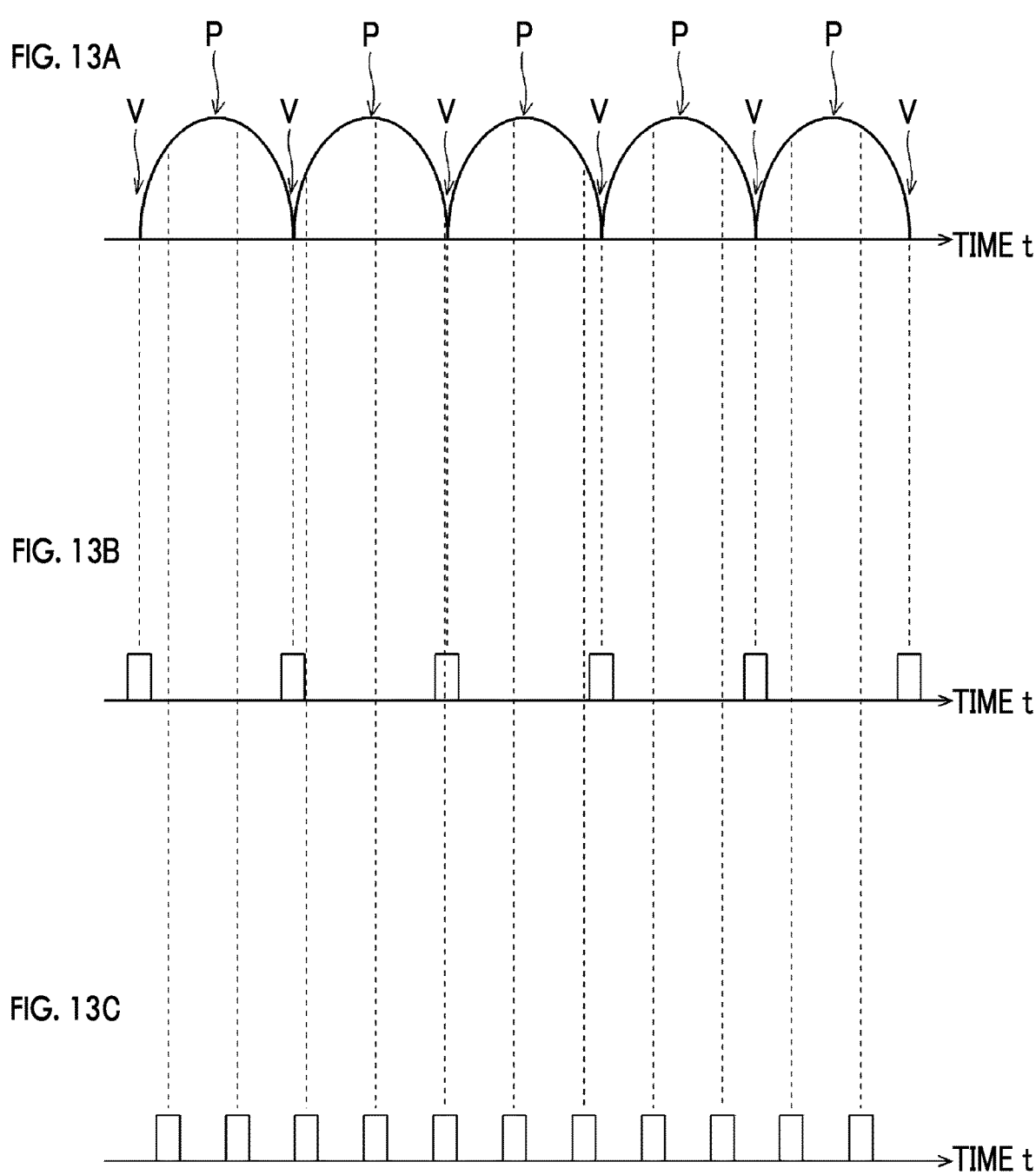
FIGS. 13A to 13C are diagrams showing a flicker cycle and an exposure timing of each frame.

FIGS. 13A to 13C are diagrams showing a flicker cycle and an exposure timing of each frame. The parts already described in FIGS. 3A to 3C are designated by the same reference numerals and the description thereof will be omitted. FIG. 13A is a diagram showing the time change of the light amount in the flicker together with the time (t) indicated by the horizontal axis. FIG. 13B shows the exposure timing of each frame in the set frame cycle in the static image extraction video capturing mode. In the set frame cycle, the exposure timing is the valley part V, and the flicker phase and the exposure timing in the set frame cycle match.

FIG. 13C shows the exposure timing in the reset frame cycle. The reset frame cycle is shorter than the set frame cycle. The image capturing timing in the reset frame cycle is controlled so as to be different from the flicker phase.

As described above, the flicker phase is different from the image capturing timing (exposure timing) in the reset frame cycle. Therefore, it is possible to acquire many frames captured with appropriate brightness.

Configuration of Smartphone

In the above description, the interchangeable lens camera has been used as an example of the image capturing device 10 in FIG. 1, but the application of the present invention is not limited thereto. Examples of another aspect to which the present invention can be applied include a portable phone or smartphone having a camera function, a personal digital assistant (PDA), and a portable game machine. Hereinafter, an example of the smartphone to which the present invention can be applied will be described. The image capturing section 201, the control section 240, the operation section 250, the storage section 260, and the monitor 270 in FIG. 1 correspond to a camera section 541, a main control section 501, an operation section 540, a recording section 550, and a display panel 521 in FIG. 15, respectively.

Figure 14:
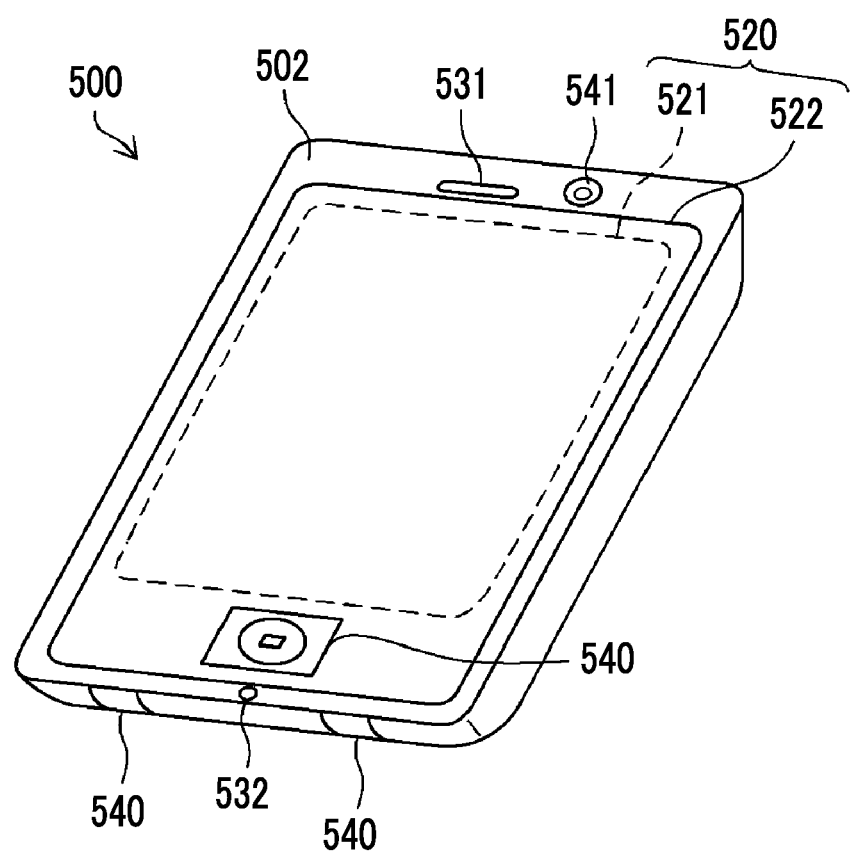
FIG. 14 is a diagram showing an appearance of a smartphone.

FIG. 14 is a diagram showing an appearance of a smartphone 500 which is an embodiment of the image capturing device 10 of the present invention. The smartphone 500 shown in FIG. 14 has a flat housing 502 and comprises a display and input section 520 in which the display panel 521 as a display section and an operation panel 522 as an input section are integrated on one surface of the housing 502. The housing 502 comprises a speaker 531, a microphone 532, an operation section 540, and a camera section 541. A configuration of the housing 502 is not limited thereto. For example, a configuration in which the display section and the input section are independent or a configuration having a folding structure or a slide mechanism can be employed.

Figure 15:
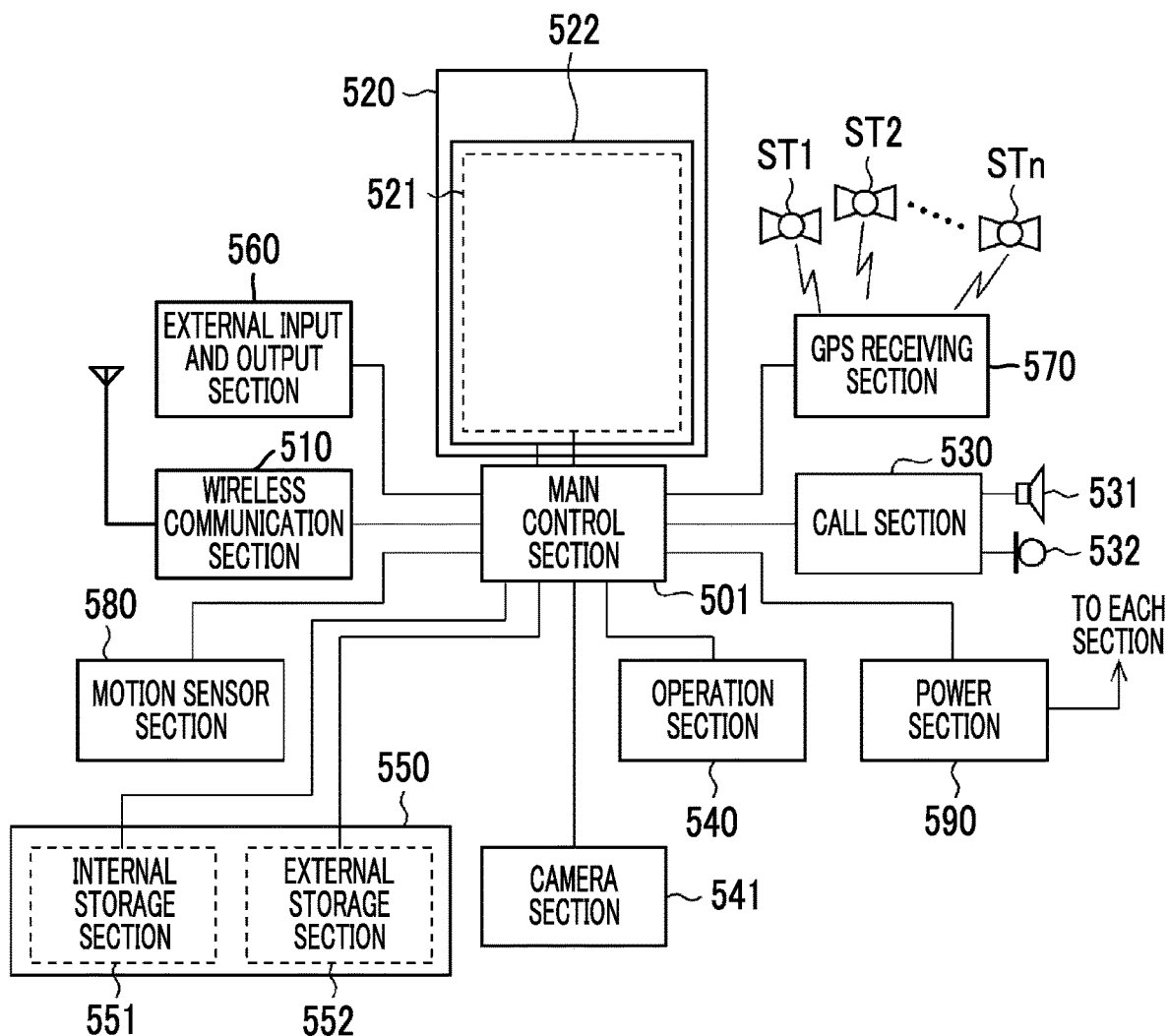
FIG. 15 is a block diagram showing a configuration of the smartphone.

FIG. 15 is a block diagram showing a configuration of the smartphone 500 shown in FIG. 14. As shown in FIG. 15, a wireless communication section 510 that performs mobile wireless communication through a base station and a mobile communication network, the display and input section 520, a call section 530, the operation section 540, the camera section 541, the recording section 550, an external input and output section 560, a global positioning system (GPS) receiving section 570, a motion sensor section 580, a power section 590, and the main control section 501 are provided as main components of the smartphone.

The wireless communication section 510 performs the wireless communication with the base station accommodated in the mobile communication network in response to an instruction from the main control section 501. This wireless communication is used to transmit and receive various pieces of file data such as voice data and image data, e-mail data, and the like, and receive Web data, streaming data, and the like.

The display and input section 520 is a so-called touch panel in which the image (static image and video), character information, or the like is displayed to visually transmit information to the user and a user operation on the displayed information is detected under control of the main control section 501, and comprises the display panel 521 and the operation panel 522.

The display panel 521 uses a liquid crystal display (LCD), an organic electro-luminescence display (OELD), or the like as the display device. The operation panel 522 is a device that is placed such that an image displayed on a display surface of the display panel 521 is visually recognizable and that detects one or a plurality of coordinates operated by a finger of the user or a stylus. In a case where such a device is operated by the finger of the user or the stylus, a detection signal generated due to the operation is output to the main control section 501. Next, the main control section 501 detects an operation position (coordinates) on the display panel 521 based on the received detection signal.

As shown in FIG. 14, although the display panel 521 and the operation panel 522 of the smartphone 500 exemplified as an embodiment of the image capturing device 10 according to the embodiments of the present invention integrally constitute the display and input section 520, the operation panel 522 is disposed so as to completely cover the display panel 521. In a case where such a disposition is employed, the operation panel 522 may comprise a function of detecting the user operation even in a region outside the display panel 521. In other words, the operation panel 522 may comprise a detection region (hereinafter referred to as display region) for an overlapping portion that overlaps the display panel 521 and a detection region (hereinafter referred to as non-display region) for an outer edge portion, which is other than the detection region, that does not overlap the display panel 521.

A size of the display region and a size of the display panel 521 may be perfectly matched, but the sizes are not necessarily matched. The operation panel 522 may comprise two sensitive regions of the outer edge portion and an inner portion other than the outer edge portion. Further, a width of the outer edge portion is designed as appropriate according to a size of the housing 502 or the like. Examples of a position detection method employed in the operation panel 522 include a matrix switch method, a resistive film method, a surface acoustic wave method, an infrared method, an electromagnetic induction method, and an electrostatic capacitive method, and any method may be employed.

The call section 530 comprises the speaker 531 and the microphone 532. The call section 530 converts a voice of the user input through the microphone 532 into voice data that can be processed by the main control section 501 and outputs the converted voice data to the main control section 501, or decodes the voice data received by the wireless communication section 510 or the external input and output section 560 and outputs the decoded voice data from the speaker 531. As shown in FIG. 14, for example, it is possible to mount the speaker 531 and the microphone 532 on the same surface as a surface on which the display and input section 520 is provided.

The operation section 540 is a hardware key using a key switch or the like and receives the instruction from the user. For example, as shown in FIG. 14, the operation section 540 is a push-button type switch that is mounted on a side surface of the housing 502 of the smartphone 500, is turned on in a case of being pressed with a finger or the like, and is turned off by restoring force of a spring or the like in a case where the finger is released.

The recording section 550 stores a control program or control data of the main control section 501, application software, address data in which a name, a telephone number, and the like of a communication partner are associated, data of transmitted and received e-mails, Web data downloaded by Web browsing, or downloaded content data, and temporarily stores streaming data or the like. The recording section 550 is composed of an internal storage section 551 built into the smartphone and an external storage section 552 having an attachable and detachable external memory slot. Each of the internal storage section 551 and the external storage section 552 constituting the recording section 550 is formed by using a recording medium such as a flash memory type, a hard disk type, a multimedia card micro type, a card type memory (for example, MicroSD (registered trademark) memory or the like), a random access memory (RAM), or a read only memory (ROM).

The external input and output section 560 serves as an interface with all external devices connected to the smartphone 500, and is for directly or indirectly connecting to another external device by communication or the like (for example, universal serial bus (USB), IEEE1394, or the like) or by a network (for example, Internet, wireless local area network (LAN), Bluetooth (registered trademark), radio frequency identification (RFID), infrared communication (infrared data association: IrDA) (registered trademark), ultra wideband (UWB) (registered trademark), ZigBee (registered trademark), or the like).

Examples of the external device connected to the smartphone 500 include a wired/wireless headset, a wired/wireless external charger, a wired/wireless data port, a memory card or a subscriber identity module (SIM)/user identity module (UIM) card connected through a card socket, external audio and video devices connected through audio and video input and output (I/O) terminals, wirelessly connected external audio and video devices, a wired/wirelessly connected smartphone, a wired/wirelessly connected personal computer, a wired/wirelessly connected PDA, and an earphone. The external input and output section 560 can transmit the data transmitted from such an external device to each component inside the smartphone 500 or can transmit the data inside the smartphone 500 to the external device.

The GPS receiving section 570 receives GPS signals transmitted from GPS satellites ST1 to STn in response to the instruction from the main control section 501 and executes positioning calculation processing based on the plurality of received GPS signals to detect a position of the smartphone 500 (latitude, longitude, and altitude). In a case where position information can be acquired from the wireless communication section 510 or the external input and output section 560 (for example, wireless LAN), the GPS receiving section 570 can detect the position thereof using the position information.

The motion sensor section 580 comprises, for example, a triaxial acceleration sensor and a gyro sensor, and detects a physical movement of the smartphone 500 in response to the instruction from the main control section 501. With the detection of the physical movement of the smartphone 500, a moving direction or acceleration of the smartphone 500 is detected. The detection result is output to the main control section 501.

The power section 590 supplies electric power accumulated in a battery (not shown) to each section of the smartphone 500 in response to the instruction from the main control section 501.

The main control section 501 comprises a microprocessor and operates according to the control program or the control data stored in the recording section 550 to integrally control each section of the smartphone 500. The main control section 501 comprises a mobile communication control function for controlling each section of a communication system and an application processing function for performing voice communication or data communication through the wireless communication section 510.

The application processing function is realized by the main control section 501 operating according to the application software stored in the recording section 550. Examples of the application processing function include an infrared communication function that controls the external input and output section 560 to perform data communication with a counterpart device, an e-mail function that transmits and receives e-mail, a web browsing function that browses a Web page, and an image processing function that performs the compression processing according to the embodiments of the present invention.

The main control section 501 comprises the image processing function such as displaying a video on the display and input section 520 based on the image data (data of static image or video) such as received data or downloaded streaming data. The image processing function means a function of the main control section 501 decoding the image data described above, performing the image processing on such a decoding result, and displaying an image on the display and input section 520.

Further, the main control section 501 executes display control for the display panel 521 and operation detection control for detecting the user operation through the operation section 540 and the operation panel 522.

With the execution of the display control, the main control section 501 displays an icon for activating the application software, a software key such as a scroll bar, or a window for creating an e-mail. The scroll bar is a software key for receiving an instruction to move a display portion of an image, such as a large image that does not fit in the display region of the display panel 521.

With the execution of the operation detection control, the main control section 501 detects the user operation through the operation section 540, receives an operation for an icon or an input of a character string in an input field of a window through the operation panel 522, or receives a request for scrolling the display image through the scroll bar.

Further, with the execution of the operation detection control, the main control section 501 determines whether the operation position for the operation panel 522 is the overlapping portion (display region) that overlaps the display panel 521 or the other outer edge portion (non-display region) that does not overlap the display panel 521, and has a touch panel control function for controlling the sensitive region of the operation panel 522 or a display position of the software key.

The main control section 501 can also detect a gesture operation for the operation panel 522 and execute a function set in advance in response to the detected gesture operation. The gesture operation does not mean a conventional simple touch operation, but means an operation of drawing a trajectory with a finger or the like, designating a plurality of positions at the same time, or a combination of these to draw the trajectory about at least one from the plurality of positions.

The camera section 541 is a digital camera (image capturing device) that performs the image capturing electronically using the image capturing element such as a complementary metal oxide semiconductor (CMOS) or a charge-coupled device (CCD), and corresponds to the image capturing device 10 shown in FIG. 1. The camera section 541 can compress the image data of the static image obtained by the image capturing by, for example, joint photographic coding experts group (JPEG) or compress the image data of the video by, for example, H.264/AVC to record the compressed image data in the recording section 550 or output the compressed image data through the external input and output section 560 or the wireless communication section 510, under the control of the main control section 501. In the smartphone 500 shown in FIG. 14, the camera section 541 is mounted on the same surface as the display and input section 520, but the mounting position of the camera section 541 is not limited thereto. The camera section 541 may be mounted on a back surface of the display and input section 520, or a plurality of camera sections 541 may be mounted. In a case where the plurality of camera sections 541 are mounted, the camera sections 541 to be used for image capturing may be switched to perform image capturing independently, or the plurality of camera sections 541 may be used at the same time for image capturing.

The camera section 541 can be used for various functions of the smartphone 500. For example, it is possible to display the image acquired by the camera section 541 on the display panel 521 or to use the image of the camera section 541 as one of operation inputs of the operation panel 522. In a case where the GPS receiving section 570 detects a position, it is possible to detect the position with reference to the image from the camera section 541. Further, it is possible to determine an optical axis direction of the camera section 541 of the smartphone 500 or a current use environment without using the triaxial acceleration sensor or in combination with the triaxial acceleration sensor (gyro sensor) with reference to the image from the camera section 541. Of course, it is possible to use the image from the camera section 541 in the application software.

In addition, the image data of the static image or the video can be recorded in the recording section 550 or be output through the external input and output section 560 or the wireless communication section 510, by adding the position information acquired by the GPS receiving section 570, voice information acquired by the microphone 532 (the voice information may be converted into text information by voice-text conversion by the main control section or the like), posture information acquired by the motion sensor section 580, and the like.

It is needless to say that the present invention is not limited to the embodiments described above and various modifications can be made within a range not departing from the spirit of the present invention.

EXPLANATION OF REFERENCES

10: image capturing device
11: image acquisition section
13: detection section
15: image capturing frame cycle control section
17: recording video data generation section
19: flicker information acquisition section
100: interchangeable lens
110: zoom lens
120: focus lens
130: stop
140: lens drive section
200: image capturing device body
201: image capturing section
210: image capturing element
230: A/D converter
240: control section
250: operation section
260: storage section
270: monitor

What is claimed is:

1. An image capturing device comprising:
an image capturing section that includes a lens and an image capturing element and captures video data having a frame cycle of a first frame cycle; and
a processor including an image acquisition section, a detection section, and an image capturing frame cycle control section, wherein
the image acquisition section acquires the video data captured by the image capturing section,
the detection section detects a flicker of a light source from the video data,
the image capturing frame cycle control section controls the frame cycle of the video data captured by the image capturing section, and
in a case where the image capturing section captures first video data with an exposure time shorter than the first frame cycle, and in a case where the detection section detects the flicker from the first video data, the image capturing frame cycle control section changes the frame cycle of the first video data from the first frame cycle to a second frame cycle, the second frame cycle is a frame cycle shorter than the first frame cycle.

2. The image capturing device according to claim 1, wherein
the detection section detects a cycle of the flicker, and
the image capturing frame cycle control section changes the second frame cycle to a cycle of half or less of the cycle of the flicker detected by the detection section.

3. The image capturing device according to claim 1, wherein the image capturing frame cycle control section changes the second frame cycle according to a set exposure time.

4. The image capturing device according to claim 1, wherein:
the processor includes a video data generation section, and
the video data generation section generates a second video data for recording having a third frame cycle from the first video data, the third frame cycle is longer than the second frame cycle.

5. The image capturing device according to claim 4, wherein the video data generation section thins out a part of a plurality of frames constituting the first video data or combines a plurality of adjacent frames in the plurality of frames constituting the first video data to generate the second video data having the third frame cycle.

6. The image capturing device according to claim 4, wherein the video data generation section does not change the third frame cycle in a case where the detection section detects the flicker.

7. The image capturing device according to claim 4, wherein
the processor includes a flicker information acquisition section,
the flicker information acquisition section acquires phase information of the flicker detected by the detection section, and
the video data generation section generates the second video data to which the phase information is added.

8. The image capturing device according to claim 7, further comprising
a monitor that displays the phase information together with frames constituting the second video data.

9. The image capturing device according to claim 7, further comprising
a monitor, wherein
the processor includes an extraction section,
the extraction section extracts a frame from a plurality of frames constituting the second video data using the phase information, and
the monitor displays the frame extracted by the extraction section.

10. The image capturing device according to claim 4, wherein
the processor includes a flicker information acquisition section,
the flicker information acquisition section acquires phase information of the flicker detected by the detection section, and
the video data generation section selects some frames from a plurality of frames constituting the first video data by using the phase information to generate the second video data.

11. The image capturing device according to claim 1, wherein
the processor includes a flicker information acquisition section, and
the flicker information acquisition section acquires phase information of the flicker detected by the detection section.

12. The image capturing device according to claim 11, wherein the image capturing frame cycle control section further adjusts an image capturing timing of the first video data according to the phase information in a case where the detection section detects the flicker.

13. The image capturing device according to claim 11, wherein the image capturing section does not perform the image capturing in a specific phase range of the flicker using the phase information.

14. The image capturing device according to claim 1, wherein the image capturing section has a first video mode and a second video mode, captures the first video data in the first video mode, and captures third video data in which the exposure time for one frame is set to be longer than the first video data in the second video mode.

15. The image capturing device according to claim 14, wherein at least one of a tracking speed of autofocus, a tracking speed of automatic exposure, or a tracking speed of white balance is set high in the first video mode, as compared with the second video mode.

16. An image capturing device comprising:
an image capturing section that includes a lens and an image capturing element and captures video data having a frame cycle of a first frame cycle; and
a processor including an image acquisition section, a detection section, an image capturing frame cycle control section, and a video data generation section, wherein
the image acquisition section acquires the video data captured by the image capturing section,
the detection section detects a flicker of a light source from the video data,
the image capturing frame cycle control section controls the frame cycle of the video data captured by the image capturing section,
the video data generation section generates video data for recording from the video data captured by the image capturing section,
in a case where the image capturing section captures first video data with an exposure time shorter than the first frame cycle, and in a case where the detection section detects the flicker from the first video data, the image capturing frame cycle control section changes a frame cycle of the first video data captured by the image capturing section from the first frame cycle to a second frame cycle, the second frame cycle is a frame cycle shorter than the first frame cycle, and
the video data generation section generates second video data having a third frame cycle, the third frame cycle is longer than the second frame cycle.

17. The image capturing device according to claim 16 wherein,
the processor includes a flicker information acquisition section,
the flicker information acquisition section acquires phase information of the flicker detected by the detection section, and
the video data generation section generates the second video data to which the phase information is added.

18. The image capturing device according to claim 16 wherein,
the processor includes a flicker information acquisition section,
the flicker information acquisition section acquires phase information of the flicker detected by the detection section, and
the video data generation section selects some frames from a plurality of frames constituting the first video data by using the phase information to generate the second video data.

19. An image capturing method comprising:
a step of capturing video data having a frame cycle of a first frame cycle;
a step of acquiring the video data captured in the step of capturing;
a step of detecting a flicker of a light source from the video data; and
a step of controlling the frame cycle of image capturing in the step of capturing,
wherein in the step of controlling the frame cycle, in a case where first video data is captured with an exposure time shorter than the first frame cycle in the step of capturing, and in a case where the flicker is detected from the first video data in the step of detecting, the frame cycle of the first video data captured in the step of capturing is changed from the first frame cycle to a second frame cycle, the second frame cycle is a frame cycle shorter than the first frame cycle.

20. A non-transitory computer readable recording medium storing a program causing a computer to execute an image capturing process comprising
a step of capturing video data having a frame cycle of a first frame cycle;
a step of acquiring the video data captured in the step of capturing;
a step of detecting a flicker of a light source from the video data; and
a step of controlling the frame cycle of image capturing in the step of capturing,
wherein in the step of controlling the frame cycle, in a case where first video data is captured with an exposure time shorter than the first frame cycle in the step of capturing, and in a case where the flicker is detected from the first video data in the step of detecting, the frame cycle of the first video data captured in the step of capturing is changed from the first frame cycle to a second frame cycle, the second frame cycle is a frame cycle shorter than the first frame cycle.

* * * * *